(12) United States Patent  
Farquharson et al.

(10) Patent No.: US 11,047,486 B2  
(45) Date of Patent: Jun. 29, 2021

(54) EXPANDING GATE VALVE

(71) Applicant: Stream-Flo Industries Ltd., Edmonton (CA)

(72) Inventors: Keith David Farquharson, Edmonton (CA); Tianle Guo, Edmonton (CA); Thomas L. Gust, Edmonton (CA); Tony M. Lam, Edmonton (CA); Andrew Francis Masson, Edmonton (CA)

(73) Assignee: Stream-Flo Industries Ltd., Edmonton (CA)

( * ) Notice: Subject to any disclaimer, the term of this patent is extended or adjusted under 35 U.S.C. 154(b) by 439 days.

(21) Appl. No.: 15/901,719

(22) Filed: Feb. 21, 2018

(65) Prior Publication Data

US 2018/0238456 A1  Aug. 23, 2018

Related U.S. Application Data

(60) Provisional application No. 62/461,524, filed on Feb. 21, 2017.

(51) Int. Cl.
| | |
|---|---|
| *F16K 3/20* | (2006.01) |
| *F16K 3/02* | (2006.01) |
| *F16K 3/18* | (2006.01) |
| *F16K 3/16* | (2006.01) |

(52) U.S. Cl.  
CPC ............ *F16K 3/207* (2013.01); *F16K 3/0236* (2013.01); *F16K 3/16* (2013.01)

(58) Field of Classification Search  
CPC .......... F16K 3/207; F16K 3/0236; F16K 3/16; F16K 3/186  
See application file for complete search history.

(56) References Cited

U.S. PATENT DOCUMENTS

| | | |
|---|---|---|
| 1,756,615 A | 4/1930 | Wolff |
| 1,874,405 A | 8/1932 | Wood |
| 2,479,124 A | 8/1949 | Laurent |
| (Continued) | | |

OTHER PUBLICATIONS

Enform, The Safety Association for Canada's Upstream Oil and Gas Industry (2013) "Gate Valve Bonnet Failures From Thermal Expansion of Fluids at High-Temperature," Safety Alert Issue #7-2013, 1 page.

(Continued)

*Primary Examiner* — Marina A Tietjen  
(74) *Attorney, Agent, or Firm* — Leydig, Voit & Mayer, Ltd.

(57) ABSTRACT

An expanding gate valve and method is provided for bidirectional sealing capability against pressure, whether the direction of pressure is upstream or downstream. The bidirectional annular seat seals against the gate assembly against pressure from the normal wellhead direction, typically upstream. For sealing against pressure in the opposite direction, the seat is formed with an annular recess extending radially outwardly from the central bore of the annular seat so that a flex portion of the seat formed between the recess and the front sealing face of the annular seat at the central bore flexes toward the gate assembly against this pressure. The front face of the bidirectional seat forms a raised annular sealing portion on the flex portion of the seat adjacent the central bore to provide sealing contact with the gate assembly in the expanded condition when the flex portion flexes toward the gate assembly.

38 Claims, 12 Drawing Sheets

(56) References Cited

U.S. PATENT DOCUMENTS

| | | |
|---|---|---|
| 2,482,409 A | 9/1949 | Fowler |
| 2,583,512 A | 1/1952 | Laurent |
| 2,670,752 A | 3/1954 | Laurent |
| 3,068,901 A | 12/1962 | Anderson |
| 3,349,789 A | 10/1967 | Crain et al. |
| 4,103,863 A | 8/1978 | Houlgrave et al. |
| 4,124,194 A | 11/1978 | Alvarez et al. |
| 4,179,099 A | 12/1979 | Pierce, Jr. |
| 4,208,035 A | 6/1980 | Alvarez et al. |
| 4,258,743 A | 3/1981 | Dare et al. |
| 4,291,862 A | 9/1981 | Alvarez et al. |
| 4,313,458 A | 2/1982 | Burns et al. |
| 4,320,890 A | 3/1982 | Meyer et al. |
| 4,393,889 A | 7/1983 | Binegar et al. |
| 4,471,943 A | 9/1984 | Nelson |
| 4,489,918 A | 12/1984 | Kalsi |
| 4,515,174 A | 5/1985 | Hollister et al. |
| 4,531,710 A | 7/1985 | Tort |
| 4,711,262 A | 12/1987 | Wafer et al. |
| 4,771,805 A | 9/1988 | Maa |
| 4,911,407 A | 3/1990 | Paul, Jr. |
| 5,158,264 A | 10/1992 | Le et al. |
| 5,163,655 A | 11/1992 | Chickering, III et al. |
| 5,201,872 A | 4/1993 | Dyer |
| 5,211,373 A | 5/1993 | Baker |
| 5,291,912 A | 3/1994 | Comeaux |
| 5,346,179 A | 9/1994 | Lochmann |
| 5,435,520 A | 7/1995 | Vyvial |
| 5,551,471 A | 9/1996 | Sandling et al. |
| 5,762,320 A | 6/1998 | Williams et al. |
| 6,158,718 A | 12/2000 | Lang et al. |
| 6,164,622 A | 12/2000 | Partridge |
| 7,325,783 B2 | 2/2008 | Hunter |
| 8,297,590 B2 | 10/2012 | Arriens, Jr. et al. |
| 8,327,866 B2 | 12/2012 | Parks, Jr. |
| 8,403,296 B2 | 3/2013 | Phillips |
| 8,689,886 B2 | 4/2014 | Wolfe et al. |
| 8,695,637 B2 | 4/2014 | McBride |
| 8,777,184 B2 | 7/2014 | Brock |
| 8,794,593 B2 | 8/2014 | Kahn |
| 9,353,871 B2 | 5/2016 | Hoang et al. |
| 9,395,002 B2 | 7/2016 | McEvoy et al. |
| 9,453,578 B2 | 9/2016 | Sundararajan |
| 9,562,613 B2 | 2/2017 | Arora |
| 9,835,258 B2 | 12/2017 | Hoang et al. |
| 2017/0146135 A1 | 5/2017 | Arora |
| 2018/0087674 A1 | 3/2018 | Hoang et al. |

OTHER PUBLICATIONS

Farquharson, Keith (Oct. 1, 2012) "Design Enhancement to Model 'A' High-Temperature Gate Valves," Engineering Advisory #57, published by Stream-Flo Industries Ltd., 1 page.

Eleniak, Glen (Oct. 16, 2012) "Model 'A' 2-1/16 2000 PSI Gate Valve Design Enhancement," Engineering Advisory #58, published by Stream-Flo Industries Ltd., 1 page.

EXPANDING GATE VALVE

CROSS REFERENCE TO RELATED APPLICATIONS

This application claims priority from U.S. Provisional Patent Application No. 62/461,524 filed Feb. 21, 2017, which is incorporated by reference herein to the extent that there is no inconsistency with the present disclosure.

FIELD OF THE INVENTION

This invention relates to expanding gate valve devices, bidirectional annular seats for expanding gate valve devices, a method of providing bidirectional sealing in an expanded gate valve device, and expanding gate valves with pressure relief against ice expansion. The invention has particular application in expanding gate valves devices for thermal wells where providing for bidirectional sealing against upstream and downstream pressure and/or providing pressure relief ice and thermal expansion can be problematic.

BACKGROUND

Expanding gate valve devices are well known for high pressure fluid control in oil and gas wellheads. An expanding gate assembly is slidably mounted within the valve chamber of a valve body and is connected to an actuated valve stem for linear movement between open and closed positions. There are many known designs for the gate assembly components of expanding gate valve devices. Generally, the gate assembly includes a pair of gate plate members, sometimes termed a gate member and a segment, which together assume or provide a wedged and mating arrangement so as to be moveable in a collapsed condition between open and closed valve positions, and so as to be disposed in an expanded condition in at least the closed valve position, and in some embodiments in both the open and the closed positions. In the expanded condition, contact surfaces on opposite planar sealing faces of the gate assembly make sealing contact with sealing surfaces of annular valve seats. The seats are held in seat pockets formed in the flow passage of the valve body. Sealing can be mechanically controlled to provide a sufficient seat-to-gate sealing force for a metal-to-metal seal at the opposing planar and parallel surfaces of the expanding gate assembly. For example, a hand wheel is often used to apply torque to the valve stem in order to apply linear force to the valve gate.

High temperature and high pressure wellheads, such as are encountered in SAGD applications (Steam Assisted Gravity Drainage), are typically termed "thermal wellheads". The expanding gate valve devices in thermal wellheads are exposed to extreme temperatures, for example from −40 to 650° F. Start-up of thermal wellheads can be problematic. Extreme pressure build-up can occur in the gate valve chamber from thermal expansion of grease and/or from ice expansion on freezing. This extreme pressure build-up from expansion can occur either if the valve body is full of water in freezing conditions (ice expansion), or if the valve body is full of grease or a grease/water mixture at high temperature (grease thermal expansion). In general, grease thermal expansion failure resembles ice expansion failure in that both can result in extreme pressure build-up, however, solutions to the problems may differ depending on the type of expansion, the degree of pressure build-up, and the state of the gate valve whether in the open or closed position.

One solution to the problem of pressure build-up due to thermal expansion of grease is to provide for pressure relief from the valve chamber surrounding the gate assembly (see for example U.S. Pat. No. 4,515,174 to Hollister et al. and U.S. Pat. Nos. 9,353,871 and 9,835,258 to Hoang et al. Known techniques for providing pressure relief in expanding gate valves vary, for example, the gate assembly can be vented to provide for pressure relief through prefabricated venting passages (holes) formed in the gate segment, the valve body and/or the annular seats to return to the valve inlet flow passage. While a vented gate assembly can allow for proper valve operation and sealing against upstream wellhead pressure (i.e., in the normal direction of flow through the valve), and across a wide temperature range expected for thermal wellheads, the vented gate assembly may not withstand pressure testing in the opposite direction, i.e., against a downstream pressure such as a testing pressure.

As for problems associated with ice expansion in expanding gate valves, there have been incidents of extreme pressure build-up from expansion if the valve body is full of water in freezing condition. If the pressure exceeds the rated working pressure of the valve, the valve can fail. For example, there have been instances of gate valve bonnet failure on thermal wells resulting in release to the atmosphere. The failure can include stretching of the studs at the bonnet end and loss of pressure integrity between the valve body and the bonnet. Valve failure due to ice expansion continues to be a problem in the industry, and known techniques for pressure relief from thermal expansion do not adequately address the issues.

SUMMARY OF THE INVENTION

In one embodiment, an expanding gate valve is provided with bidirectional sealing capability so that a bidirectional annular metal seat seals against pressure regardless of the direction of the pressure, i.e., against upstream or downstream pressure. The valve devices includes a valve body having a valve chamber therein and axially aligned first and second flow passages communicating with the valve chamber. A bonnet assembly closes the valve chamber. An annular seat pocket is formed in the valve body surrounding the second flow passage and opening into the valve chamber. The seat pocket forms a side wall axially aligned with the second flow passage and a back wall generally at a right angle to the side wall. An expanding gate assembly including a first member facing the first flow passage and a second member facing the second flow passage, is slidably mounted within the valve chamber for linear movement between open and closed positions. The gate assembly has an expanded condition with the first and second members expanding away from each other at the closed position, and a collapsed condition with the first and second members collapsing together as the gate assembly is moved between the open and closed positions. The first member and the second member are each formed with a port in a ported portion of the members, the port extending therethrough alignable with the flow passages in the open position. A stem is coupled to the gate assembly to move the gate assembly between the open and closed positions relative to the first and second flow passages.

A bidirectional metal annular seat is included within the seat pocket. The seat is adapted for sealing to the side wall and to the back wall of the seat pocket when the seat is in sealing contact with the gate assembly. The seat is formed with a central bore aligned with the flow passages, opposed front and rear sealing faces, and opposed inner and outer peripheral surfaces, so that when seated, the inner peripheral surface faces the central bore, the outer peripheral surface faces the side wall of the seat pocket, the front sealing face faces the gate assembly and, against pressure along the first flow passage, makes sealing contact with the second member of the gate assembly when the gate assembly is in the expanded condition, and the rear sealing face faces and makes sealing contact with the back wall of the seat pocket. The annular seat is formed with an annular recess extending generally radially outwardly from the inner peripheral surface so that a flex portion of the seat located between the recess and the front sealing face at the central bore flexes toward the second member of the gate assembly against pressure along the second flow passage. The front face of the annular seat forms an annular sealing portion on the flex portion of the seat adjacent the central bore. The annular sealing portion is raised relative to a generally planar portion of the front face to provide sealing contact with the second member of the gate assembly when the gate assembly is in the expanded condition and when the flex portion flexes toward the second member against pressure along the second flow passage.

In some embodiments, the bidirectional metal annular seat is adapted to provide an interference fit within the seat pocket so as to provide a metal-to-metal seal to one or both of the side wall and the back wall of the seat pocket.

In some embodiments, the valve device is vented to provide pressure relief from the valve chamber into the first flow passage. In some embodiments, the first flow passage is formed with a seat pocket and holds either, a unidirectional metal annular seat or the bidirectional metal annular seat, for sealing to the first member of the gate assembly in the expanded condition. To provide pressure relief, one or more of the gate assembly, the valve body, and the annular seat in the first flow passage includes one or more pressure relief passages communicating between the valve chamber and the first flow passage to provide pressure relief in one or both of the open and closed positions.

There is also broadly provided a method of sealing a gate assembly in an expanding gate valve device against pressure along either of the flow passages, wherein the expanding gate valve is as described above, and the method comprises:

(i) providing bidirectional sealing capability to the annular seat, by:

(a) forming the annular seat with an annular recess extending generally radially outwardly from the inner peripheral surface so that a flex portion of the seat located between the recess and the front sealing face at the central bore flexes toward the second member of the gate assembly gate member against pressure along the second flow passage, and (b) forming the front face of the annular seat with an annular sealing portion on the flex portion of the seat adjacent the central bore, the annular sealing portion being raised relative to a generally planar portion of front face to provide sealing contact with the second member of the gate assembly when the gate assembly is in the expanded condition and when the flex portion face flexes toward the second member against pressure along the second flow passage;

(ii) operating the expanding gate valve device against pressure along the first flow passage with the annular seat making sealing contact with the gate assembly when the gate assembly is open and closed positions; and (iii) operating or testing the expanding gate valve device against pressure along the second flow passage with the flex portion of the downstream annular seat flexing toward the gate member and with the annular sealing portion on the flex portion making sealing contact with the second member when the gate assembly is in the expanded condition.

There is also broadly provided an expanding gate valve device to provide pressure relief for ice expansion. The valve device is generally as described above, although the metal annular seat need not be the bidirectional metal annular seat described above, and the first flow passage is optionally formed with a seat pocket holding a metal annular seat for sealing to the first member of the gate assembly in the expanded condition. For pressure relief from ice expansion, a first pressure relief passage communicating between the valve chamber and the first flow passage in the closed position is formed in one or more of the gate assembly, the valve body and the annular seat in the first flow passage. The pressure relief passage is unobstructed so as to allow ice forming therein to be extruded by the pressure of ice expansion. The first pressure relief passage has a transverse cross section sized such that, ice forming in the first pressure relief passage extrudes in a direction from the valve chamber to the first flow passage, and at a pressure less than the pressure capacity of each of the valve body and the bonnet assembly.

In some embodiments, the first pressure relief passage is formed in the first member, or in the first member and in the second member communicating between the valve chamber and the first flow passage in the closed position.

In some embodiments, the first pressure relief passage is located in a half portion of the first member opposite the ported portion, or in the half portion opposite the ported portion of both the first member and the second member. The first pressure relief passage has an outlet opening into the first flow passage in the closed position of the gate assembly, and one or more inlets opening into the valve chamber in the closed position of the gate assembly.

In some embodiments, the first pressure relief passage is a generally T-shaped port of cylindrical cross section, with the outlet positioned generally centrally in the half portion opposite the ported portion, and having an axis parallel to a centre axis of the first flow passage, and with a pair of inlets aligned along an inlet axis which is oriented perpendicular to, and intersecting with, the outlet axis, the inlets being formed in one or both of the first member and the second member.

In some embodiments, one or both of the first member and the second member of the gate assembly is formed with a second pressure relief passage communicating between the valve chamber and the first flow passage when the gate assembly is in the open position.

In some embodiments, the gate assembly is of a type wherein the first member is a segment and the second member is a gate member, and the gate assembly is adapted to be in the expanded condition in both the open and closed positions.

As used herein and in the claims, the following terms have the following meanings:

The term "upstream", as for example used with "upstream pressure" or for the location of upstream components of the valve, means on the side of the gate assembly normally experiencing or facing wellhead pressure. In embodiments described hereinbelow in association with the figures, this upstream pressure is along the first flow passage of the valve, which is termed the inlet flow passage.

The term "downstream", as for example used with "downstream pressure" or for the location of downstream components of the valve, means on the side of the gate assembly opposite the upstream side. The "downstream pressure" might be, for example, a testing pressure. In embodiments described hereinbelow in association with the figures, this downstream pressure is along the second flow passage of the valve, which is termed the inlet flow passage.

It will be understood by those skilled in the art that, in some applications, such as in thermal wellheads, the direction of pressure across the gate assembly can change, depending on the mode of operation at the wellhead, for example during injection, shut-in and production modes during SAGD operations. Thus, the direction of upstream or downstream pressure is more broadly referred to herein and in the claims as being along the first or second flow passage of the valve to avoid limiting the invention or the claims to a particular orientation of the valve. Similarly, the valve, or the gate assembly within the valve may be oriented differently than as shown and described herein and in the figures, so terms such as "upper", "lower", "above", "below", "vertical" or "horizontal" are not meant to limit a particular orientation of the valve or its components as defined in the claims.

The term "bidirectional" as used with reference to the downstream annular seat, or bidirectional sealing capability, means the annular seat seals to the expanding gate assembly in the expanded condition, and to the seat pocket, in both directions, i.e., against either upstream pressure or downstream pressure.

The term "interference fit" as used with reference to the annular seat(s) being fitted into the seat pockets, means the annular seats are formed with dimensions slightly larger than the dimensions of the seat pockets, and the annular seats are press fit into the seat pockets, for example by hydraulic pressing or by heating or cooling the seats and seat pockets. The interference fit results in metal-to-metal seals to the seat pockets. This term "interference fit" as applied to the annular seats is in contrast to "floating seats" which have some limited movement relative to the seat pockets and require one or more seals, such as elastomeric seals, to the seat pockets. Floating seats are generally problematic for thermal wellheads, as the wellhead temperatures may destroy or damage the seals to the seat pockets. The "interference fit" as applied to the annular seats is also in contrast to seats which include one or more welds to the seat pockets or to the flow passages of the valve.

BRIEF DESCRIPTION ON THE DRAWINGS

FIG. 1 is sectional view of one embodiment of an expanding gate valve device showing an expanding gate assembly of a gate/segment type, and adapted to be in an expanded condition in both of the fully open and the fully closed conditions. In FIG. 1, the gate assembly is in the fully open position and in an expanded condition. The figure shows the normal direction of flow through the valve from upstream wellhead pressure along the inlet flow passage. The central bore in each of the upstream and downstream annular seats is aligned with the port in the gate member and the segment of the gate assembly to provide flow through the valve. The upstream and downstream annular seats seal against the gate assembly in this expanded condition of the gate assembly. The downstream annular seat is formed with features for bidirectional sealing.

Figure 8:
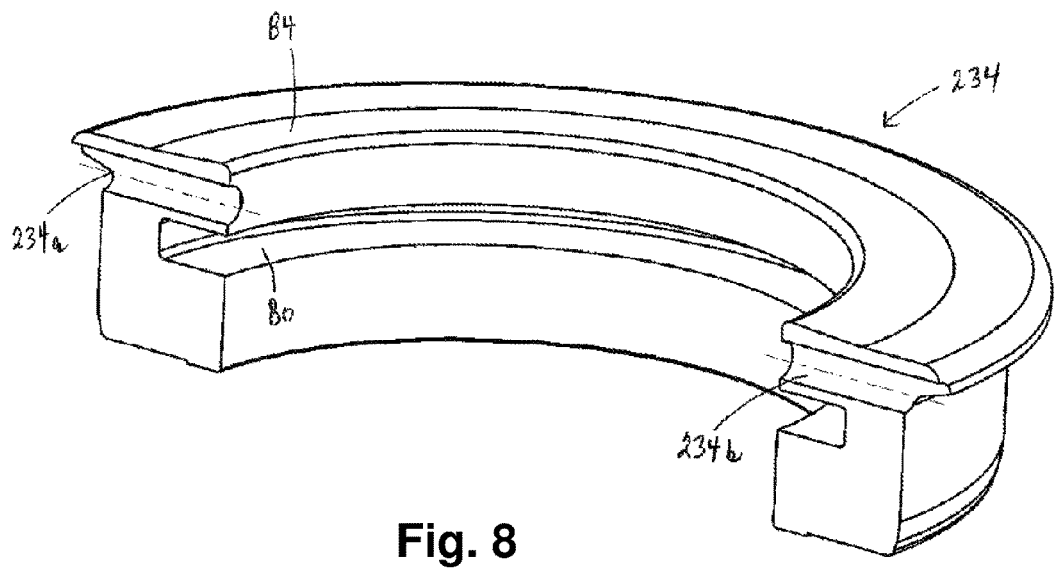

FIG. 8 is a perspective view of another embodiment of the upstream annular seat which differs from that of FIGS. 1-4 by including the features of the annular recess and the raised annular sealing portion as described for the downstream annular seat, and also showing pressure relief ports extending radially through the annular seat to provide pressure relief on the upstream side of the valve device.

Figure 9:
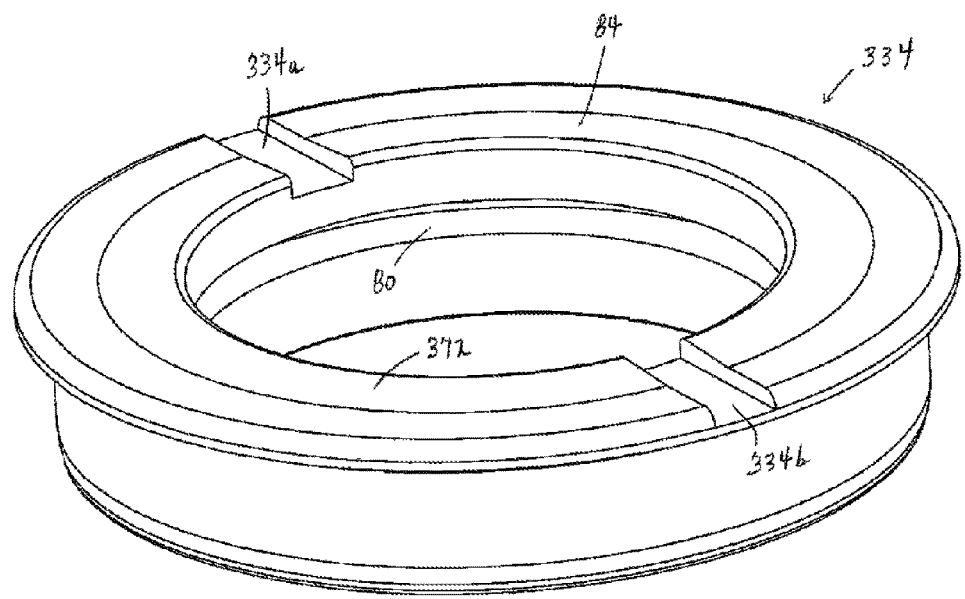

FIG. 9 is a perspective view of a further embodiment of an upstream annular seat, similar to the seat of FIG. 8, but showing pressure relief passages formed as seat vent channels or grooves extending radially across the front face of the seat to provide pressure relief, for example from thermal expansion.

Figure 1:
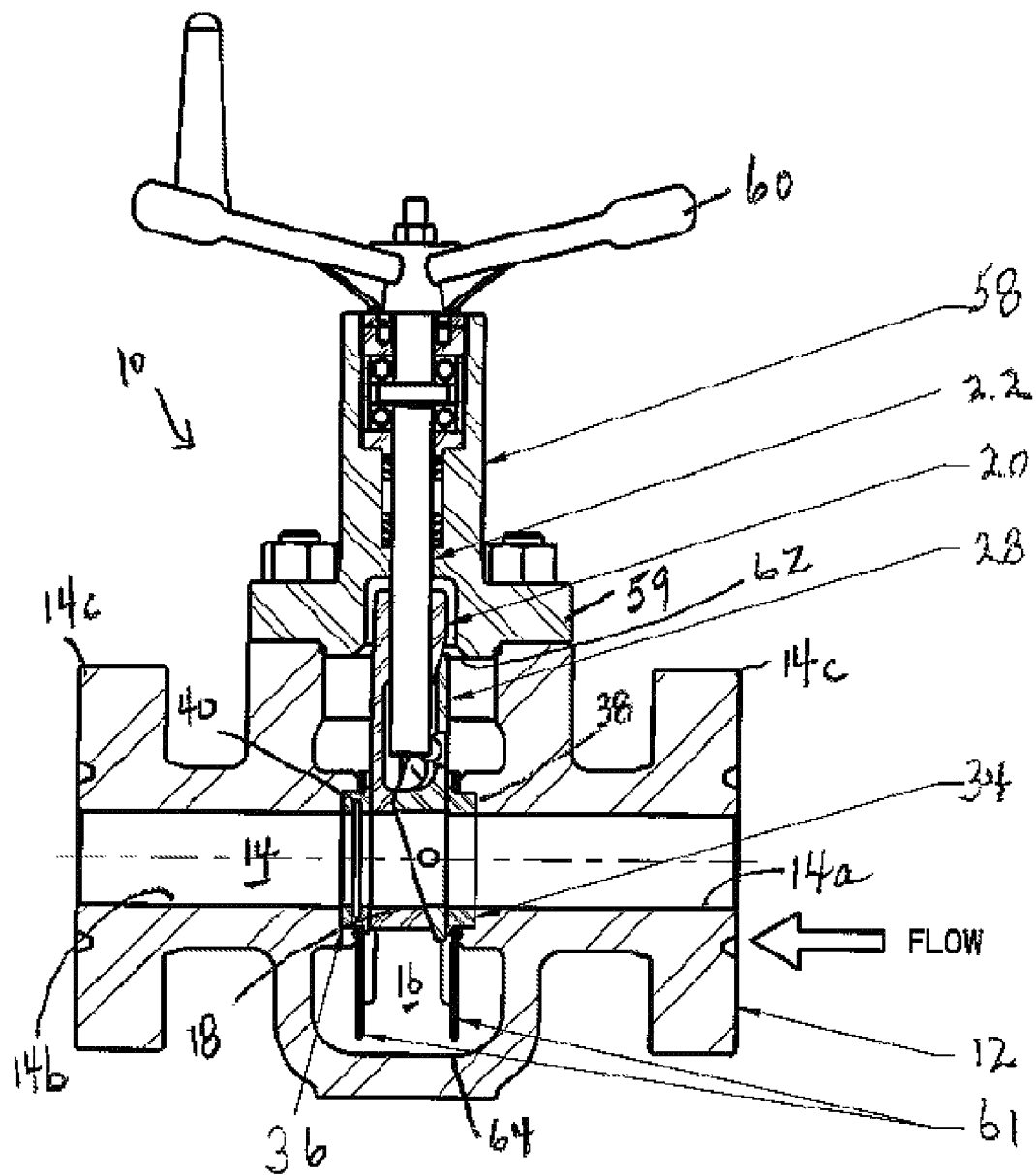
Figure 10:
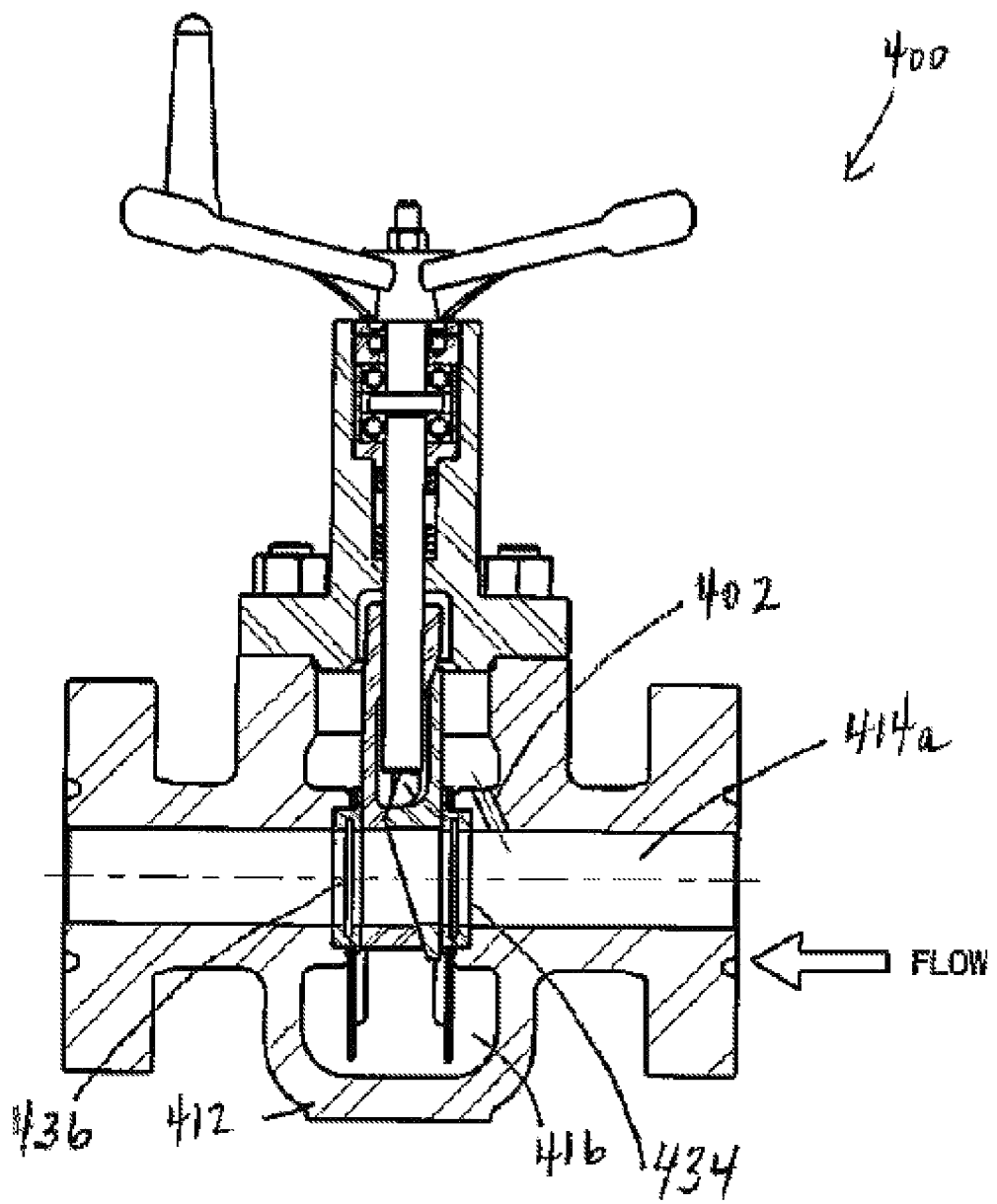

FIG. 10 is a sectional view of another embodiment of an expanding gate valve device, similar to that of FIG. 1, showing both the upstream and the downstream annular seats formed with the annular recess and raised annular sealing portion for bidirectional sealing capability, but also showing an embodiment of venting the valve body with a pressure relief passage extending through the valve body from the valve chamber to the inlet flow passage to provide pressure relief on the upstream side of the valve device.

Figure 7:
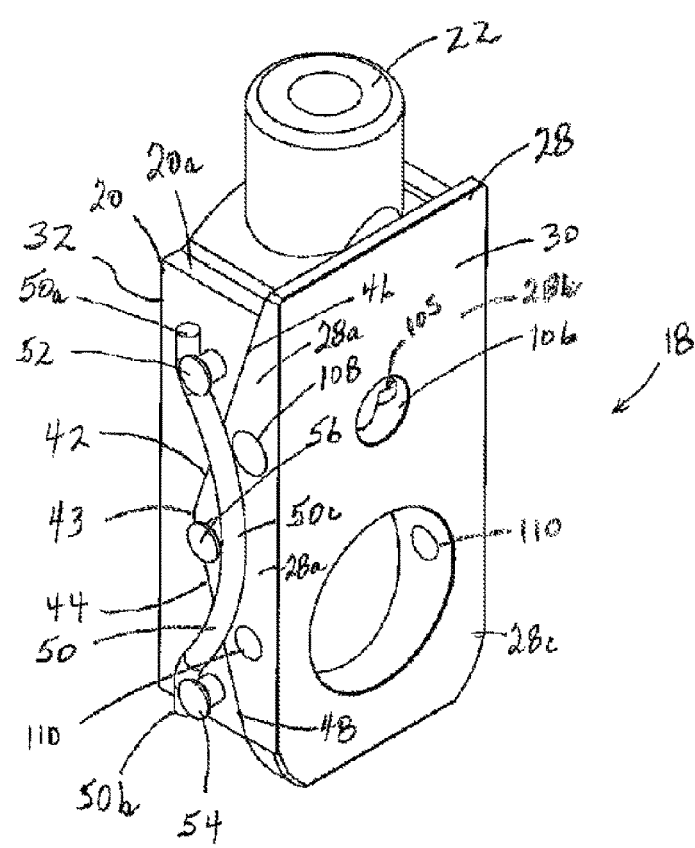
FIG. 7 is a perspective view of the gate assembly components showing the pressure relief passages in the segment in greater detail.
Figure 11:
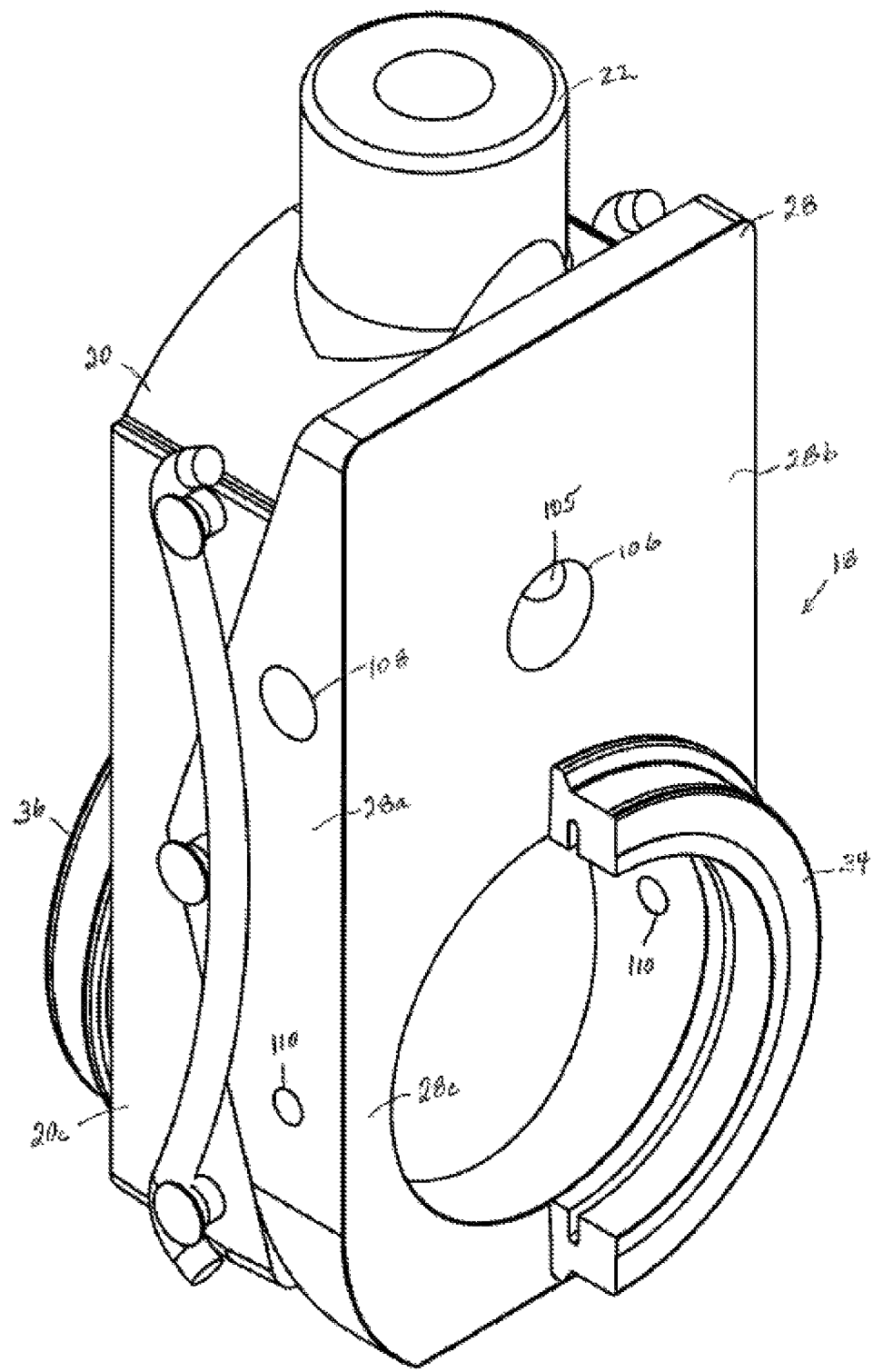

FIG. 11 is a perspective view of the gate assembly as shown in FIG. 7, showing the position of the upstream and the downstream annular seats in the fully open position of the gate assembly, with upstream seat being partially cut away. This figure shows a first pressure relief passage formed in the half portion of the segment opposite the ported portion to provide pressure relief from ice expansion in the closed position of the valve. The first pressure relief passage is generally T-shaped with an outlet located to open into the inlet flow passage in the closed position, and with axially aligned inlets communicating with the outlet, located to open into the valve chamber in the closed position. FIG. 11 also shows second pressure relief passages formed in the ported portion of the segment, providing fluid communication between the valve chamber and the inlet flow passage to provide pressure relief in the open position of the valve.

Figure 12:
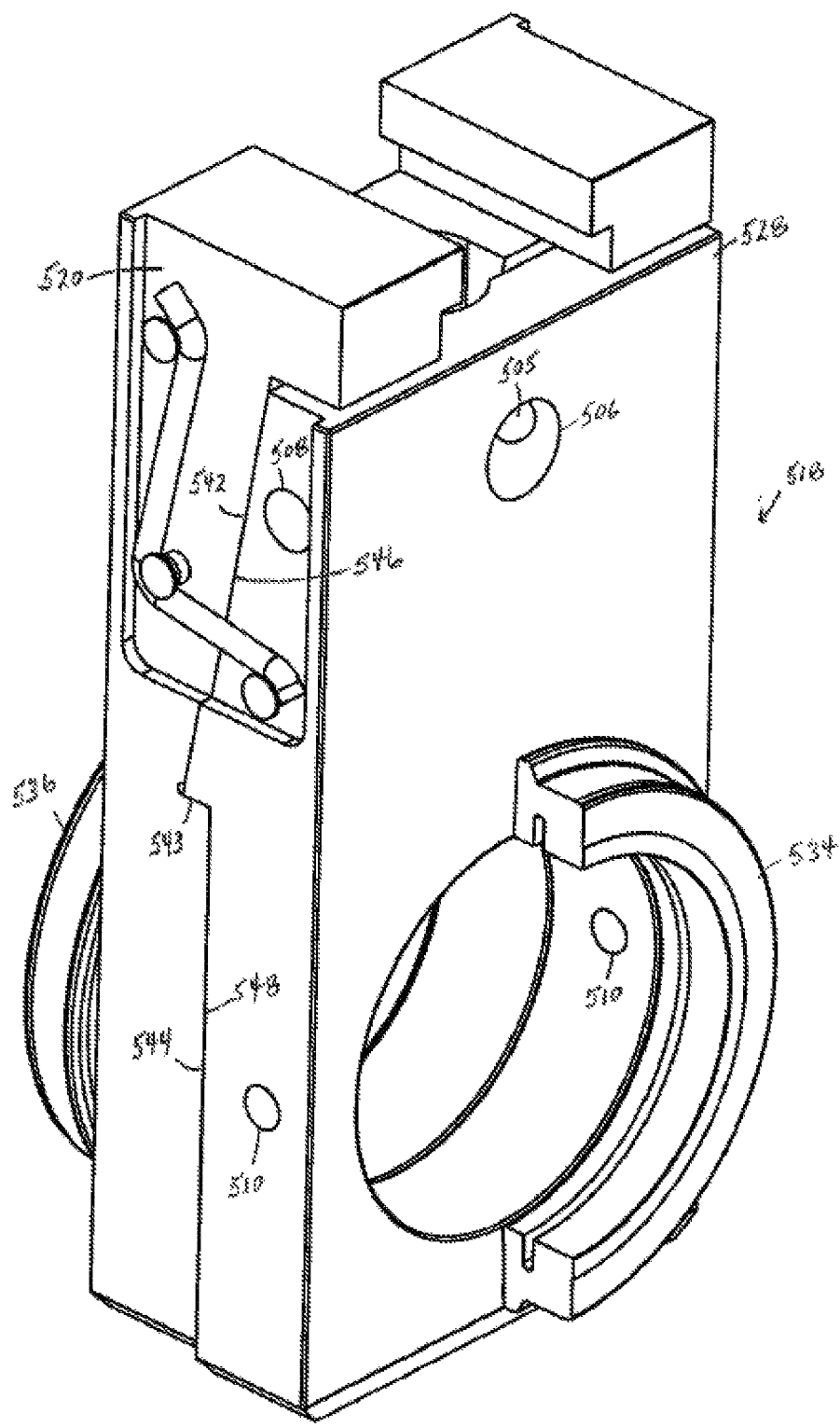

FIG. 12 is a perspective view similar to the view of FIG. 11, but with an alternate embodiment of a gate assembly. The gate assembly of FIG. 12 is similar to that shown in U.S. Pat. No. 6,158,718 to Lang et al., and is shown with the upstream and downstream annular seats as shown in FIG. 11. However, instead of a gate and segment as in FIG. 11, a first member of the gate assembly facing the inlet flow passage is supported on a notched shoulder formed in a second member of the gate assembly, but the first and second members are otherwise similarly adapted to expand in the open and closed positions of the gate assembly, and to collapse together as the gate assembly is moved between the open and closed positions. The gate assembly is adapted to show the first pressure relief passage to accommodate ice expansion in the closed position, and the second vent passages for pressure relief in the open position.

Figure 13:
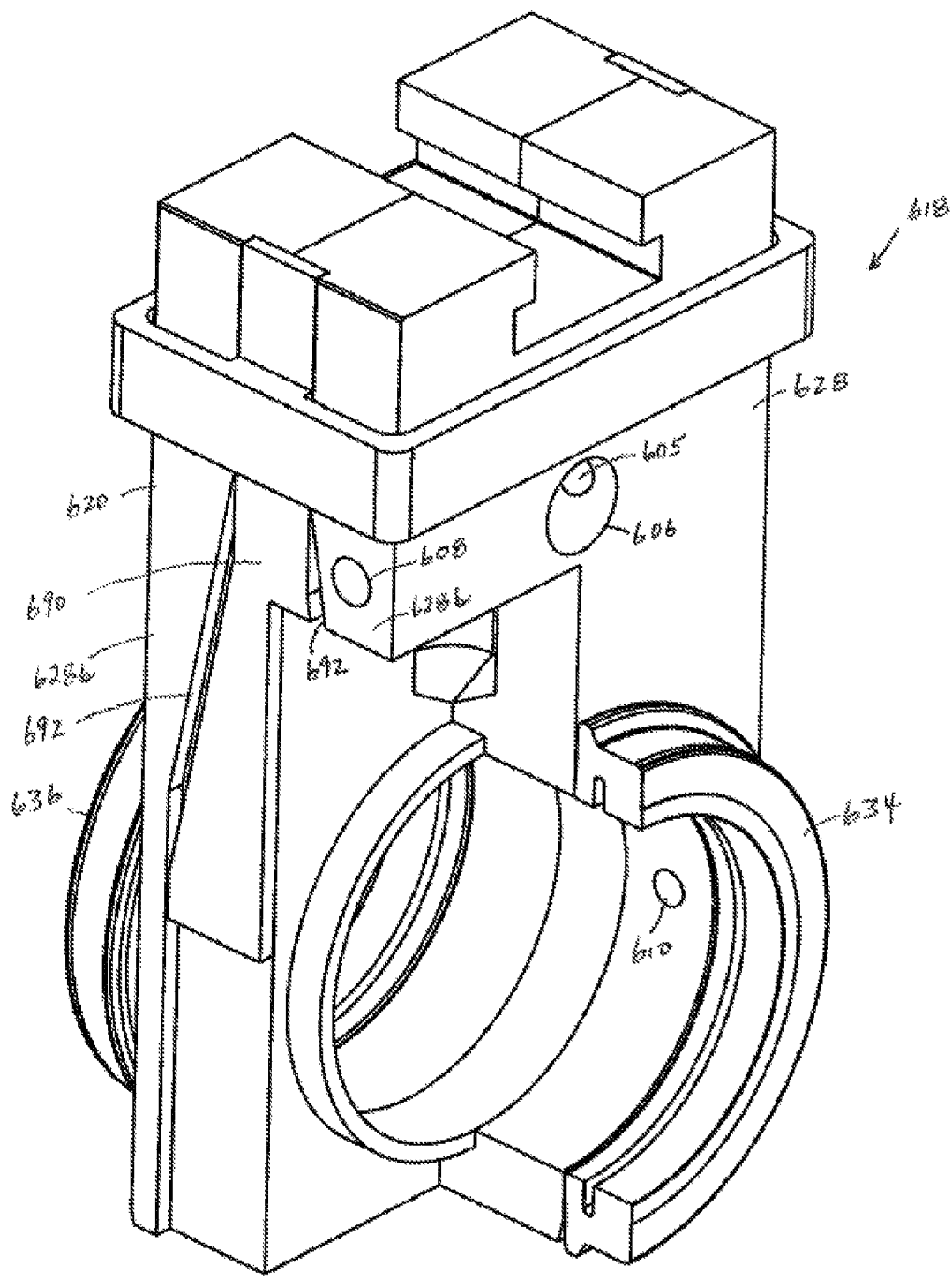

FIG. 13 is a perspective view similar to the view of FIG. 11, but with a further alternate embodiment of a gate assembly. The gate assembly includes a wedge shaped spreader assembly which engages camming grooves formed in the side walls of the first and second members so that the members assume an expanded condition only in the closed position. The gate assembly of FIG. 13 is similar to that described in U.S. Pat. Nos. 3,349,789 and 4,179,099, but is further adapted herein to show the first pressure relief passage for ice expansion in the closed position, and the second vent passages for pressure relief in the open position.

Figure 14:
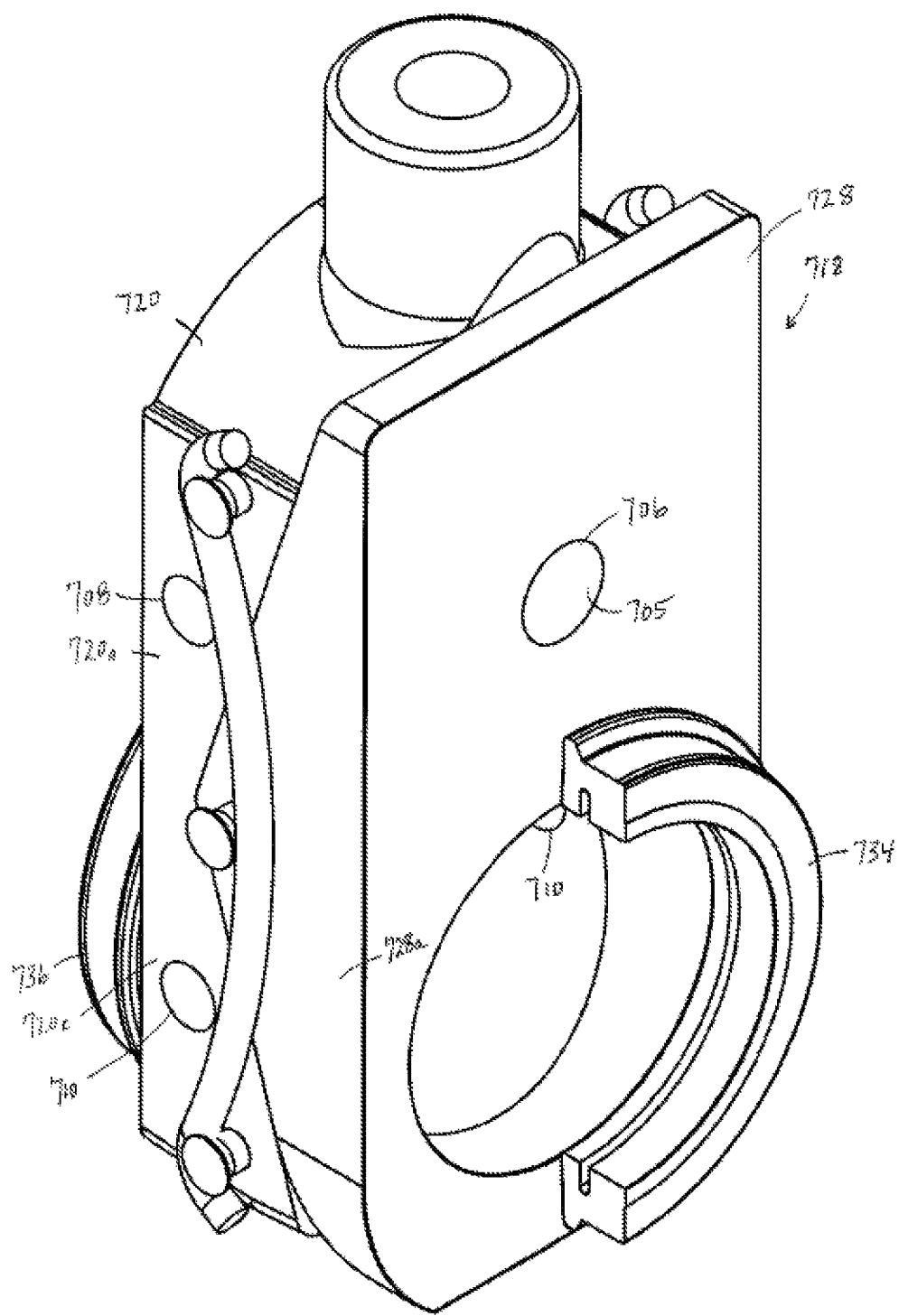

FIG. 14 is a perspective view similar to the view of FIG. 11, showing another embodiment of a gate assembly together with the upstream and the downstream annular seats, with the gate assembly in the fully open position and with the upstream seat partially cut away. This figure shows another embodiment for the location of the first and second pressure relief passages. The first pressure relief passage is located to provide pressure relief from ice expansion in the closed position of the gate assembly. The first pressure relief passage is T-shaped, with inlets axially aligned in the gate member to communicate with the valve chamber, and an outlet formed in the segment member, located to communicate with the inlet flow passage in the closed position of the gate assembly. The first pressure relief passage is thus formed in both of the gate and segment members, and communicates through a stem operating cavity formed in the inner surfaces of the gate and segment members. FIG. 14 also shows another embodiment of second pressure relief passages formed in the ported half portion of the gate member, providing fluid communication between the valve chamber and the inlet flow passage to provide pressure relief in the open position of the valve.

DETAILED DESCRIPTION OF THE INVENTION

The invention has wide application to provide bidirectional sealing capability and/or pressure relief in expanding gate valve devices. In the description below, as directed to FIGS. 1-11, the invention is shown with an expanding gate valve device known in the industry as a gate/segment type expanding gate valve. In this embodiment, the gate assembly has a first member adapted to face an inlet flow passage of the valve, and which is termed a segment, and a second member adapted to face an outlet flow passage of the valve, and which is termed a gate member. In FIGS. 1-11, metal annular seats are shown on both sides of the expanding gate assembly, however, it will be understood, that bidirectional sealing in accordance with the present invention can be achieved on one side of an expanding gate valve, and the metal annular seat need not be present on the other side, or a unidirectional metal annular seat can be used on the other side. As well, the invention has broad application for other types of expanding gate valve devices. Two examples of other types of expanding gate valves common in the oil and gas industry are shown in FIGS. 12 and 13 to illustrate the bidirectional sealing capability and/or the pressure relief features of the present invention applied to other expanding gate valve devices.

Figure 2:
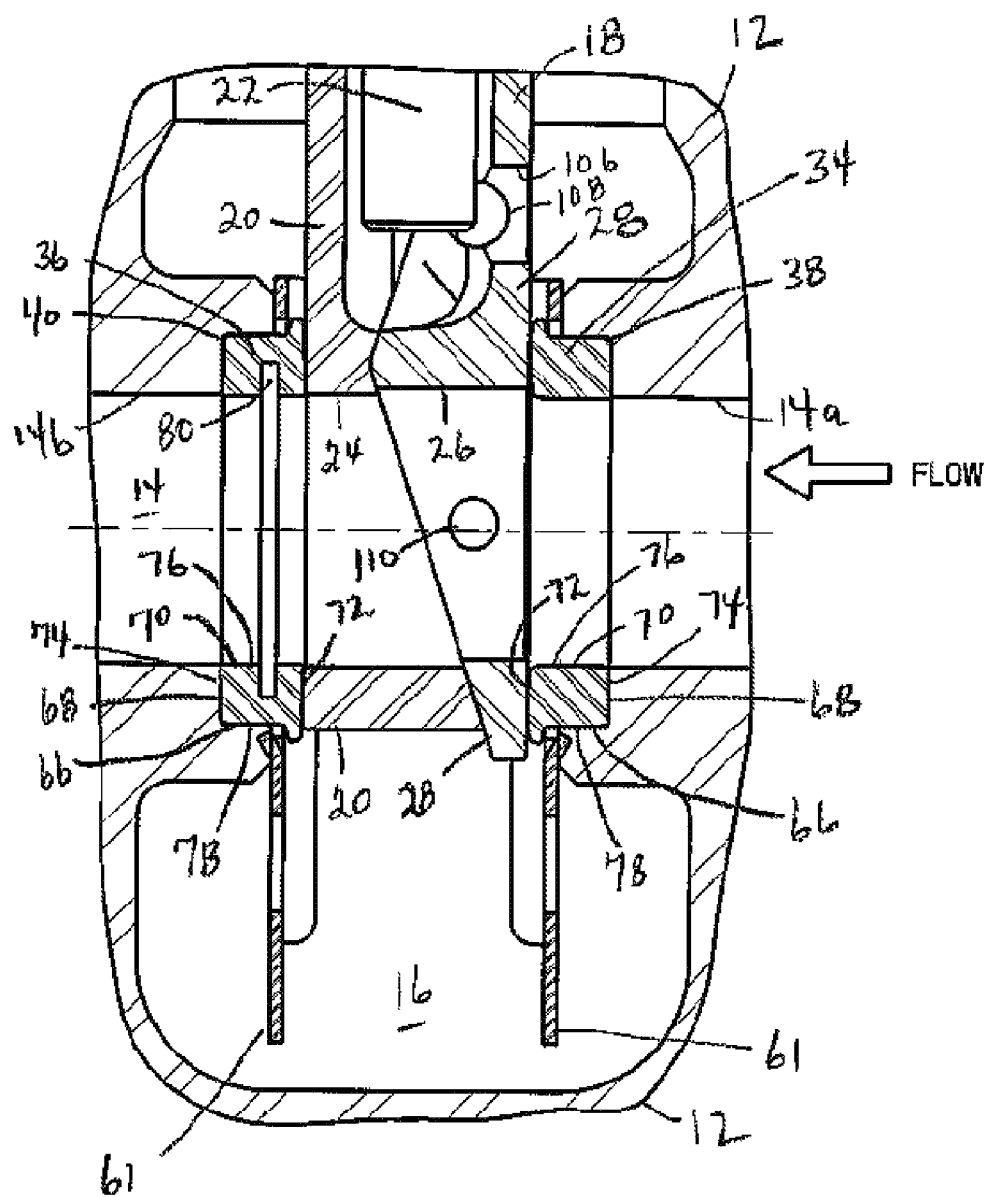
FIG. 2 is an enlarged view of a portion of FIG. 1, showing the annular seats in sealing contact with the expanded gate assembly, sealing against upstream wellhead flow pressure, and showing a pressure relief passage formed in the segment of the gate assembly to provide pressure relief in the open position, for example from thermal expansion.

One embodiment of a gate/segment type of expanding gate valve device is shown generally at 10 in FIGS. 1-4. The valve device 10 includes a metal valve body 12 defining a flow passage 14 extending therethrough and including an inlet flow passage 14a and an outlet flow passage 14b. Flanges 14c are provided for connecting the valve 10 to other wellhead equipment. Alternate connections for the flange connections are known and may be used. The Figures show a normal direction of flow for the valve 10 from an upstream wellhead pressure side, entering the inlet flow passage 14a and exiting at the downstream outlet flow passage 14b. The valve body forms a valve chamber 16 between the inlet and outlet flow passages 14a, 14b. A flow control component, herein termed an expanding gate assembly 18, is movably disposed for linear sliding movement within the valve chamber 16. The gate assembly 18 includes a metal gate member 20 having an actuating valve stem 22 connected to an upper end portion, and a metal segment member 28. The gate member 20 defines a port 24 formed in a lower half portion of the gate member 20. The gate port 24 is adapted to align with a port 26 of the segment member 28 in the fully open, and expanded condition of the gate assembly (FIGS. 1 and 2). When fully open, the ports 24, 26 are axially aligned and communicate with the inlet and outlet flow passages 14a, 14b of the valve body 12. The gate and segment members 20, 28 define spaced parallel planar sealing surfaces 30, 32 at the upstream and downstream sides respectively, which are adapted for sealing engagement with annular metal seat members disposed within seat pocket recesses formed in flow passages of the valve body 12.

In FIGS. 1-4, the upstream metal annular seat 34 is seated in the upstream seat pocket 38 and the downstream metal annular seat 36 is seated in the downstream seat pocket 40. The gate member 20 defines upper and lower angulated planar cam surfaces 42 and 44 which mate with the angulation of planar intersecting upper and lower surfaces 46, 48 of the segment member 28 (see FIG. 7). The gate and segment members 20, 28 assume a collapsed condition when the segment 28 rests fully within a notch 43 defined by the intersecting cam surfaces 42, 44 of the gate member 20. On both sides walls 20a, 28a of the gate and segment members 20, 28, an arched spring wire 50 is positioned with the wire extremities 50a, 50b (shown in FIG. 7) in engagement with spring retainer pins 52, 54 provided on the side wall 20a at the upper and lower extremity portions of the gate member 20. The central portion of the spring wire 50c is in engagement with a spring retainer pin 56 formed at a central portion of the segment side wall 28a, proximate the notch 43 on the gate member 20. The arched spring wire elements 50 are located on both sides of the expanding gate assembly 18. The force developed by the spring wires 50 on the pins of the gate member 20 and segment member 28 urge the free segment member 28 toward a fully seated relationship (i.e., collapsed condition) with the gate member 20 so that the surfaces 46, 48 of the segment 28 are disposed in intimate seated, fully engaging relationship with both of the angulated surfaces 42, 44 of the gate member 20. The angulated surfaces 42, 44 of the gate member 20 are planar cam surfaces which control the position of planar sealing faces 32, 30 formed respectively on the gate member 20 and the segment member 28.

The gate member 20, being connected to the valve stem 22, is movable linearly between gate guide plates 61 within the valve chamber 16 by rotational movement of the valve stem 22. The segment member 28 moves linearly with the gate member 20. The valve stem 22 extends linearly upwardly through a valve bonnet assembly 58 bolted through flange 59 to the valve body 12. The bonnet assembly 58 closes the upper end of the valve body 12 and valve chamber 16. Other connections between the bonnet assembly 58 and the valve body 12 are well known and may be used. In general, the bonnet assembly 58, its components (for example packings), and its connection to the valve body 12 (for example bolts, studs and seals), provides an industry pressure capacity to exceed normal operating pressures of the valve device 10. As well, the thickness and type of steel used for the valve body 12 and its connections to other components, provides an industry pressure capacity for the valve body to exceed normal operating pressures of the valve device 10.

Figure 3:
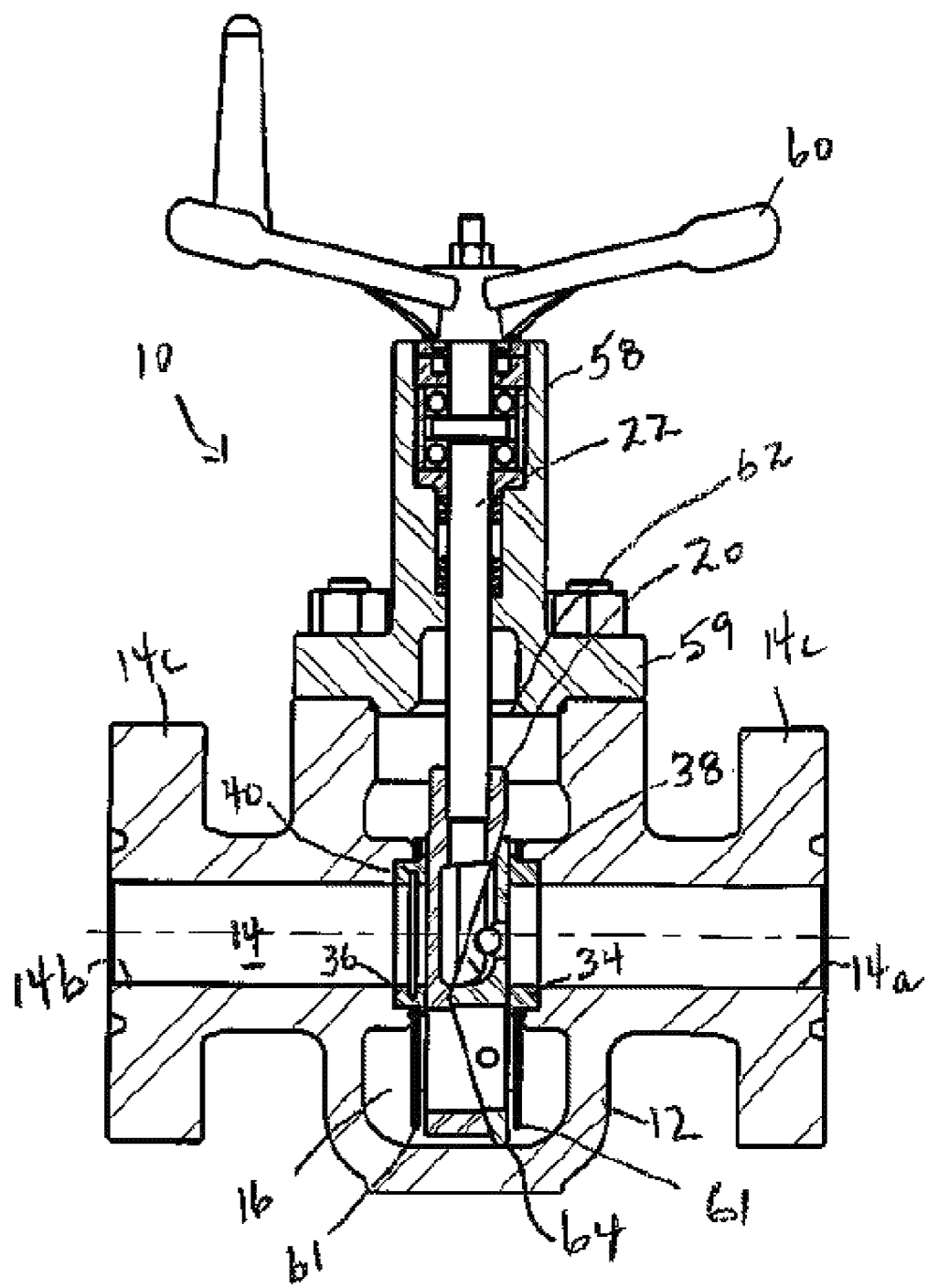
FIG. 3 is a sectional view of the expanded gate valve device of FIG. 1, but with the expanded gate assembly in the fully closed position and in an expanded condition to prevent flow through the valve. The upstream and downstream annular seats are in sealing contact with the gate assembly in this expanded condition.
Figure 4:
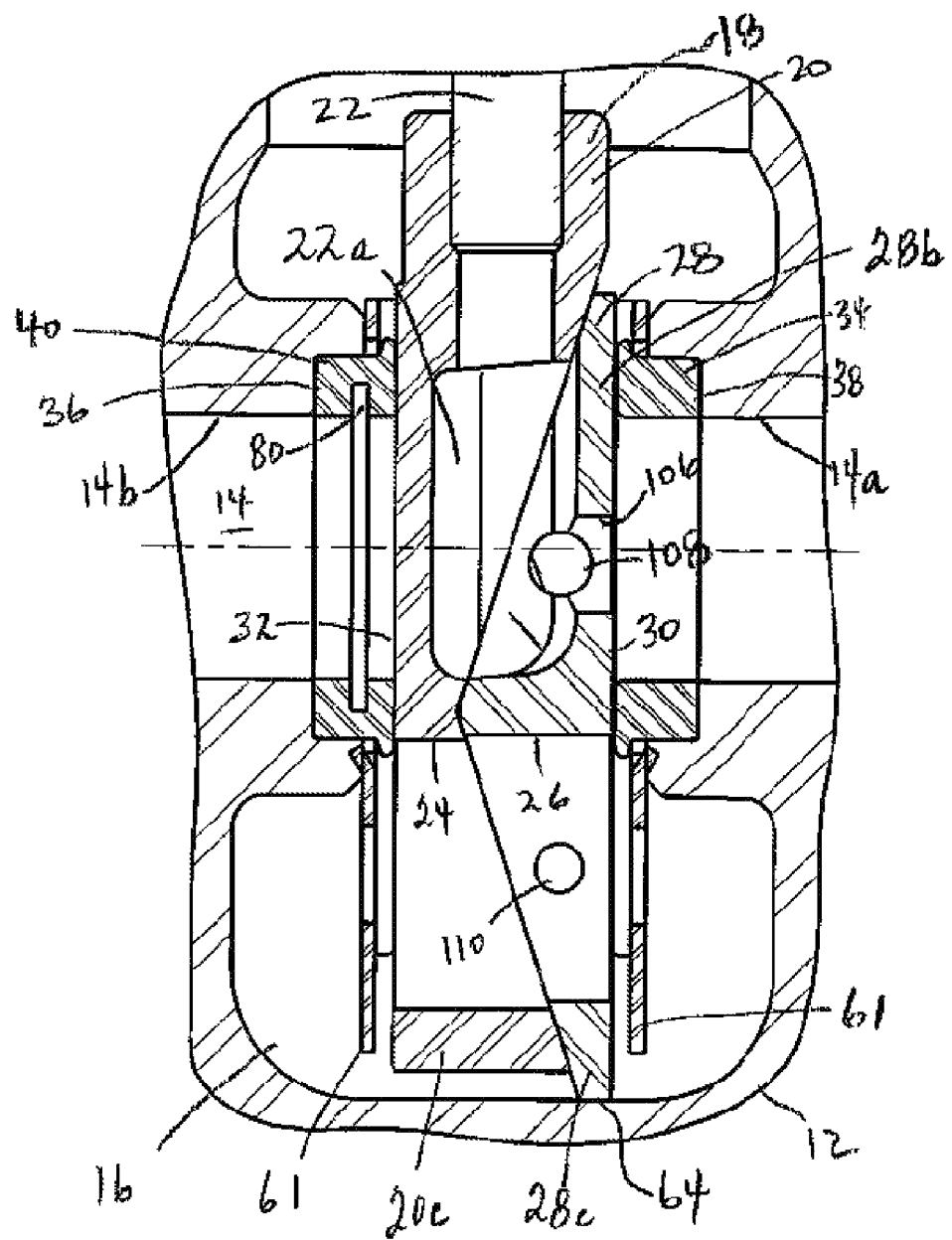
FIG. 4 is an enlarged view of a portion of FIG. 3, showing the annular seats in sealing contact with the expanded gate assembly, sealing against upstream wellhead pressure, and also showing a pressure relief passage formed in the segment to provide pressure relief in the closed position, for example from ice expansion.

The upper end portion of the valve stem 22 is connected to a handwheel 60, although other methods of valve actuation may be used, such as pneumatic and hydraulic actuators. Appropriate seals and packings are included in the stem/bonnet assembly 58, as is well known in the industry, such that rotation of the handwheel 60 provides rotational force to the valve stem 22 through to linear movement of the gate member 20. As best shown in FIG. 4, the inner mating surfaces of each of the segment 28 and gate member 20, above their ported portions 28c and 20c, form a stem operating cavity 22a to accommodate the linear movement of the gate assembly 18. While the gate member 20 moves linearly upwardly and downwardly through the valve chamber 16 in response to valve stem movement, movement of the segment member 28 is limited by upper and lower stops or stop shoulders 62, 64 provided by the valve body 12. As the upper portion 28b of the segment 28 contacts the upper stop 62, further movement of the segment member 28 is limited, and continued upward movement of the gate member 20 expands the gate assembly 18 into its expanded condition at the fully open position of the valve, as shown in FIGS. 1-2. In this position, the gate ports 24, 26 are axially aligned with each other and the ports 24, 26 are axially aligned with the inlet and outlet flow passages 14a, 14b. When the lower portion of the segment member 28 contacts the lower stop 64, further movement of the segment member 28 is limited, and further downward movement of the gate member 20 expands the gate assembly 18 into its expanded condition at the fully closed position of the valve 10, as shown in FIGS. 3-4. In both the fully open and fully closed positions, the annular seat members 34, 36 are in sealing contact with the planar sealing surfaces 30, 32 of the gate assembly 18, and the gate assembly 18 is in an expanded condition.

The upstream and downstream annular seat pockets 38, 40 are formed in the valve body 12 surrounding the flow passage 14a, 14a and open into the valve chamber 16. Each of the seat pockets 38, 40 is formed as a right angled counterbore extending into the flow passages 14a, 14b. The seat pockets 38, 40 form a peripheral side wall 66 axially aligned with the flow passages 14a, 14b, and a back wall 68 generally at a right angle to the side wall 66 (see FIG. 2).

The annular seats 34, 36 have a slightly greater initial dimension compared to the dimension of the seat pockets 38, 40 prior to insertion into the seat pockets 38, 40. As the seats 34, 35 are inserted, for example by press fitting, an interference fit is established within the seat pockets 38, 40, thereby providing a metal-to-metal seal to one or both of the back wall 68 and the side wall 66 of seat pockets 38, 40.

Certain features of the seats 34, 36 are common, whether the seat is positioned as an upstream seat 34 or a downstream seat 36. As seen in FIG. 2, each seat 34, 36 is formed with a central bore 70 to be aligned with the inlet and outlet flow passages 14a, 14b. Each seat 34, 36 has opposed, generally planar, front and rear sealing faces 72, 74, and opposed, generally planar, inner and outer peripheral surfaces 76, 78. When the seats 34, 36 are seated in the seat pockets 38, 40, the inner peripheral surface 76 faces the central bore 70, the outer peripheral surface 78 faces the side wall 66 of the seat pockets 38, 40, the front sealing face 72 faces the gate assembly 18, and the rear sealing face 74 faces the back wall 68 of the seat pockets 38, 40. The front faces 72 of the seats 34, 36, when experiencing upstream wellhead pressure along the inlet flow passage 14a, make sealing contact with the planar sealing surfaces 30, 32 of the gate assembly 18 when the gate assembly 18 is in the expanded condition, as shown in FIGS. 2 and 4. The rear sealing faces 74 of the annular seats 34, 36, due to the interference fit, and against upstream wellhead pressure, make sealing contact with the back wall 68 of the seat pockets 38, 40.

Figure 5A:
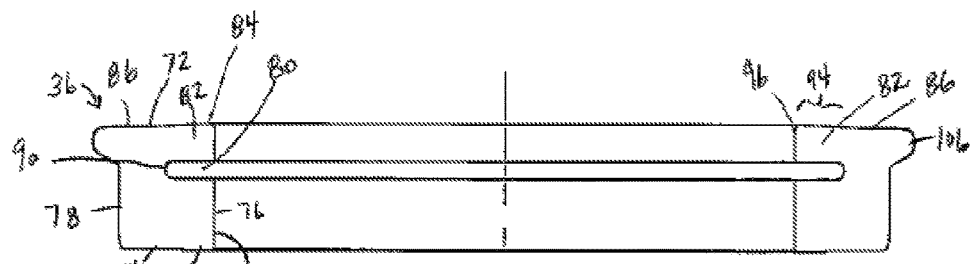
FIGS. 5A-5F are sectional views of various embodiments of the downstream annular seat, each with an annular recess extending radially inwardly from the central bore of the seat to form a flex portion at the front face, and with a raised annular sealing portion on the flex portion, to provide bidirectional sealing capacity against both upstream and downstream pressure.

The downstream annular seat 36 is shown in various embodiments in FIGS. 5A-5F. As shown in FIG. 5A, the downstream seat 36 is formed with an annular recess 80 between the front and rear faces 72, 74 and extending generally radially outwardly from the inner peripheral surface 76 so that a flex portion 82 of the seat located between the recess 80 and the front sealing face 72 at the central bore 70 is able to flex toward the gate member 20 when it experiences downstream pressure, such as a testing pressure. The annular recess 80 is generally located closer to the front face than to the rear face 74, i.e., in the top half of the seat 36. In the embodiments of the FIGS. 5A-5C, the annular recess is located in the top third of the seat 36. The front face 72 of the seat 36 is formed with an annular sealing portion 84 on the flex portion 82 of the seat 36 adjacent the central bore 70. The annular sealing portion 84 is raised relative to a generally planar front face portion 86 of the front face 72, in order to make sealing contact with the gate member 20 when the gate assembly 18 is in the expanded condition and when the front sealing face 72 flexes in the upstream direction against downstream pressure.

The annular seats 34, 36 are composed of a hard metal material such as steel, stainless steel and corrosion resistant alloys. Pressure, whether from the upstream of downstream direction, acts on the inner peripheral surface 76 of the seats. For the downstream seat 36, the annular recess 80 is located and configured such that downstream pressure along the outlet flow passage 14b also acts in the annular recess 80 on the downstream facing side of the flex portion 82, to cause the thinner flex portion 82, which is thinner relative to the full longitudinal dimension of the seat 36, to flex in the upstream direction against the downstream pressure. Thus a pressure actuated sealing capability is developed which enhances the seal established between the raised annular sealing portion 84 on the flex portion 82 and the planar sealing surface of the gate member 20 in direct response to a downstream pressure condition of the valve. As downstream pressure increases, the sealing capability of the downstream seat 36 against the gate member 20 also increases.

Figure 5B:
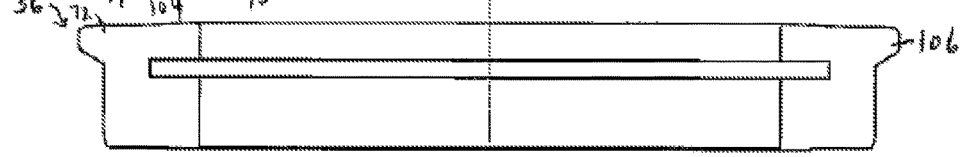
Figure 5C:
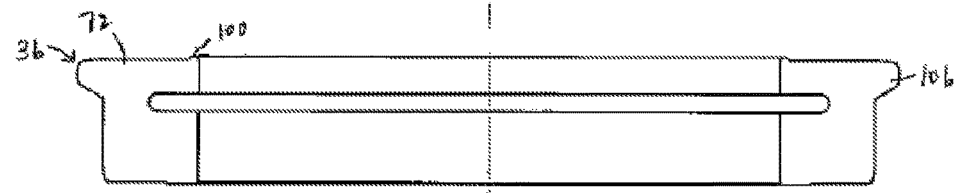
Figure 5D:
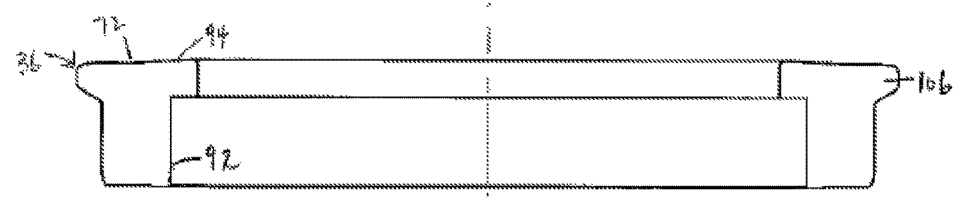
Figure 5E:
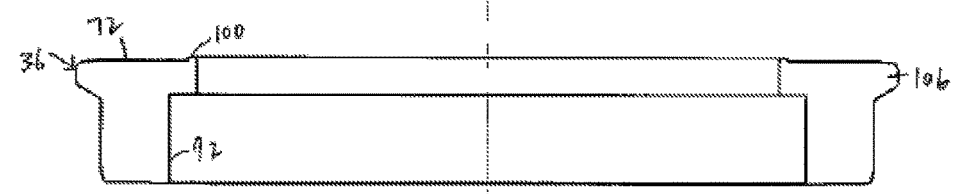
Figure 5F:
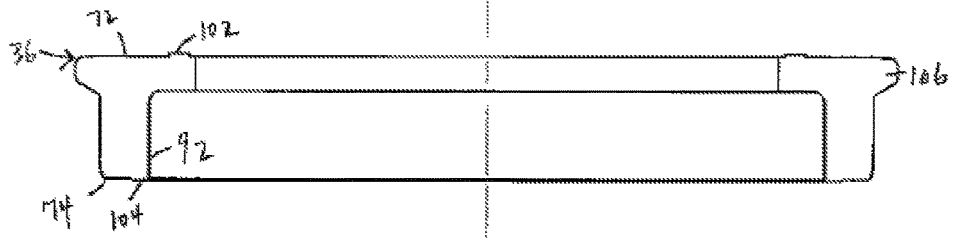

The configuration and location of the annular recess 80 may vary with the material of the seat 36, and with the configuration and location of the raised annular sealing portion 94. In some embodiments, the annular recess 80 extends generally radially outwardly by a distance (i.e., has a radial depth) between 25% and 75% of the distance between the inner and outer peripheral surfaces 76, 78, such as between 40% and 60% of the distance, or between 45% and 55% of the distance. In the embodiments of FIGS. 5A-5C, the annular recess 80 is formed as an annular groove 90 generally parallel to the front face, but other configurations of the annular groove may be used. The annular groove 90 may have rounded or square edges at its inner extremity, as shown in FIGS. 5A and 5B respectively. In the embodiments of FIGS. 5A-5C, the annular groove 90 has an annular depth of about 50% of the distance between the inner and outer peripheral surfaces 76, 78. In the embodiments of FIGS. 5D-5F, the annular recess 80 is formed as a cut-away portion 92 of the inner peripheral surface 76 and extends to the rear sealing face 74.

Figure 6:
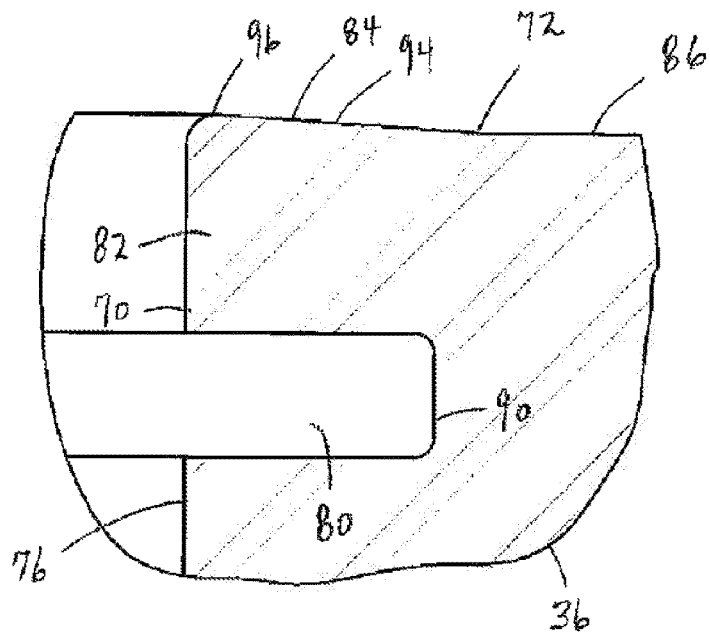
FIG. 6 is an enlarged view of the flex portion of the bidirectional annular seat of FIG. 5A, showing the annular recess formed as an annular groove, and the raised annular sealing portion formed as a taper above the annular groove.

In the embodiments of FIGS. 5A, 5B and 5D, the raised annular sealing portion 84 of the seat 36 is a tapered portion 94 extending from a most raised portion 96 at the central bore 70 and transitioning to a planar front face portion 86. In the embodiment of FIG. 6, the point at which the tapered portion 94 transitions to the planar portion 86 is beyond the radial depth of the annular recess 80. In some embodiments, the most raised portion 96 of the tapered portion 94 is raised relative to the planar front face portion 86 by about 0.003-0.010 inches, or by about 0.005 inches. In the embodiments of FIGS. 5C and 5E, the raised annular sealing portion 84 of the seat 36 is a raised bump 100 at the central bore 70. In the embodiment of FIG. 5F the raised annular sealing portion 84 of the seat 36 is a raised ridge 102, such as a rectangular ridge (when shown in cross section), formed adjacent and proximate the central bore 70.

As shown in FIGS. 5A-5F, the rear sealing face 74 of the downstream seat 36 may be formed with a raised annular sealing portion 104 relative to the otherwise generally planar surface of the rear sealing face 74. The raised annular sealing portion 104 provides a reduced surface area to apply a greater sealing pressure against the back wall 68 of the seat pocket 38 to ensure an effective metal-to-metal seal.

In configuring the downstream annular seat for bidirectional sealing, it will be understood that such factors as the seat material, the dimensions and configuration of the annular recess 80, the dimensions and configuration of the raised annular sealing portion 84 may be varied to achieve the desired amount of flexing to the flex portion 82 of the seat 36, while ensuring that the spring force of the flex portion 82 is less than the elastic limit of the seat material.

In some embodiments, as shown in FIGS. 1-4 and 5A-5F, the annular seats 34, 36 are formed with an outwardly extending annular rim 106 at the outer peripheral surface 78 at the front face 72 of the seat. This rim 106 fits over the edges of the gate guide plates 61, as shown in FIGS. 2 and 4, and assists in limiting any travel of the seat 34, 36. The rim 106 is also useful to pry the seat 34, 36 out of the seat pockets 38, 40 during servicing and repair of the valve 10.

While only the downstream seat 36 is described above with the features to provide bidirectional sealing capability, it will be understood that the upstream seat 34 may also include the bidirectional sealing features so that both seats 34, 36 are identical in the valve 10. This provides a safety feature, ensuring that the valve is not be configured using the wrong seat in the downstream seat pocket 40.

The bidirectional downstream annular seat described herein has particular application in vented, expanding gate valves for thermal applications, but may also have application in other expanding gate valves, such as for non-thermal applications. The bidirectional sealing features described herein may also have application in floating annular seats for expanding gate valves.

The invention also extends to providing pressure relief in expanding gate valve devices. In some embodiments, pressure relief from ice expansion in both the open and closed positions of the valve device is provided. Providing for ice expansion in the closed position of expanding gate valves is particularly important for thermal wellheads. In some embodiments pressure relief is also provided for the open position of the valve device, such as from thermal expansion of grease, or from water or ice expansion. The above-described bidirectional downstream seat 36 is particularly useful in thermal wellheads which are vented for pressure relief to relieve excessive fluid pressure from the valve chamber 16 into the inlet flow passage 14a, where sealing against downstream pressure is more difficult.

In FIGS. 1-4, 7 and 11, one embodiment of pressure relief is shown with a vented segment 28 for pressure relief from the valve chamber 16 to the inlet flow passage 14a. In particular, for pressure relief against ice expansion, and as best seen in FIG. 11, the segment 28 is vented in an upper half portion 28b (i.e., the segment portion opposite the ported portion 28c) with a first pressure relief passage 105 providing fluid communication between the valve chamber 16 and the inlet flow passage 14a, while still maintaining sealing on the downstream side of the gate assembly 18. Thus, the first pressure relief flow passage 105 does not provide fluid communication between the inlet and outlet flow passages 14a, 14b. The first pressure relief passage 105 extends from one or more inlets 108 opening into the valve chamber 16 through to an outlet 106 opening into the inlet flow passage 14a when the gate assembly 18 is in the closed position. In FIG. 11, the pressure relief passage 105 is a cylindrical port and the transverse cross-section at the inlets 108, the outlet and throughout the passage 105 is sized to allow ice forming along the passage to be extruded along the passage 105 by the pressure of ice expansion. This ensures that, as ice forms in a freezing condition of the valve, when the valve is closed, ice freezes in a manner such that increasing pressure of ice expansion on continued freezing forces the ice to extrude (i.e., to flow) through the pressure relief passage 105 in the direction of, and into, the inlet flow passage 14a. The flow passage 105 is shaped, sized and located in the segment member 28 to accommodate ice extrusion in the closed position, and is unobstructed by components or structures, such as valves, plugs, seats, shoulders and diametric restrictions, to allow for water infiltration and ice extrusion in the flow passage 105. In the embodiment of FIG. 11, the pressure relief passage 105 is a generally T-shaped port, with the outlet 106 positioned generally centrally in the upper half portion 28b of the segment member 28, and having a centre axis parallel to a centre axis of the inlet flow passage 14a. The inlets 108 are a pair of inlets 108 axially aligned along an inlet axis which is oriented perpendicular to, and intersecting with, the axis of the outlet 106. Thus, the outlet 106 is formed in the planar sealing face 30 of the segment 28 with an axis parallel to the inlet flow passage axis, and is in fluid communication with the inlets 108, which are axially aligned in the portion of passage 105 extending transversely through the side walls 28a of the segment member 28 to intersect the axis of the outlet 106. The pressure relief passage 105 provides pressure relief in the closed position of the gate assembly 18, as shown in FIG. 4, particularly against ice expansion.

While the first pressure relief passage 105 is shown as a T-shaped cylindrical port, it may be formed with a different cross-sectional shape, such as square or rectangular. Still alternatively, the first pressure relief passage 105 may be differently shaped, such as L-shaped, with only one inlet, and positioned wholly within in the segment member 28, or partially within the segment 28 and partially within the gate 20, as shown in FIG. 14, and as described below. Still alternatively, the first pressure relief passage may be located in the upstream annular seat, as shown in FIGS. 8 and 9, or in the valve body between the valve chamber and the inlet flow passage 14a, as shown in FIG. 10. Regardless of position, the first pressure relief passage communicates between the valve chamber 16 and the inlet flow passage 14a in the closed position of the valve.

Regardless of the shape of the first pressure relief passage 105, it has a transverse cross section sized to extrude ice in the direction from the valve chamber 16 to the inlet flow passage 14a, and at a pressure less than the pressure capacity of each of the valve body 12 and the bonnet assembly 58. As mentioned above, the valve body 12 and the bonnet assembly 58 have a pressure capacity to exceed the normal operating pressures of the valve device 10, but these pressure capacities do not necessarily exceed the pressure of ice expansion in the event that ice forms in the valve chamber 16. The first pressure relief passage 105 is sized such that ice forming in the first pressure relief passage 105 extrudes through the first pressure relief passage 105 into the inlet flow passage 14a to provide pressure relief from ice expansion at a pressure less than the pressure capacity of each of the valve body 12 and the bonnet assembly 58. This provides for pressure from ice expansion to be accommodated within the valve device below a pressure at which the valve fails, either at the bonnet connection, or in the valve body itself. While this sizing of the first pressure relief passage may vary with the overall size of the valve and the pressure capacity of the components in the valve, in some embodiments, this sizing provides a transverse cross sectional diameter at the inlets 108, the outlet 106 and within the passage 105 greater than ⅛ inch, and preferably greater than ¼ inch, such as ⅜ inch or greater.

In order to further vent the segment member 28 in the open position (as shown in FIGS. 2 and 11), the segment member 28 in some embodiments is vented in the ported portion 28c. In one embodiment, one or more second pressure relief passages 110 extend transversely through the side wall 28a of the segment 28 to communicate with the segment port 26. This provides fluid communication between the valve chamber 16 and the inlet flow passage 14a in the open position of the valve device for pressure relief, for example for grease expansion or ice expansion, while still maintaining a seal on the downstream side of the gate assembly 18.

FIG. 14 illustrates another embodiment of a gate assembly 718 together with the upstream and the downstream annular seats 734, 736, with the gate assembly 718 in the fully open position. FIG. 14 shows alternate locations for the first pressure relief passage 705 and the second pressure relief passages 710. The first pressure relief passage 705 is located to provide pressure relief from ice expansion in the closed position of the gate assembly 718. The first pressure relief passage 705 is T-shaped, as described above for FIG. 11, but with the inlets 708 axially aligned through the side walls 720a of the gate member 720, to communicate with the valve chamber, and with the outlet 706 formed in the segment member 728 and located to communicate with the inlet flow passage in the closed position of the gate assembly 728. The first pressure relief passage 705 is thus formed partly in the segment member 728 and partly in the gate segment member 720, and communicates through a stem operating cavity formed in the inner surfaces of the gate and segment members 720, 728. While the stem operating cavity is not shown in FIG. 14, it is shown in FIG. 4 as stem operating cavity 22a. FIG. 14 also shows another embodiment of second pressure relief passages 710 formed in the ported half portion 720c of the gate member 720, providing fluid communication between the valve chamber and the inlet flow passage to provide pressure relief in the open position of the valve.

In other embodiments, the first pressure relief passage 705 can be formed similarly to that shown in FIG. 14, but with inlets 708 being provided in the side walls 720a, 728a of both the gate and segment members 720, 728 to provide pressure relief in the closed position of the valve. In other embodiments, the second pressure relief passages 710 may be provided in the side walls 720a, 728a of both of the gate and segment members 720, 728 to provide pressure relief in the open position of the valve.

In another embodiment, the upstream seat may be vented to provide pressure relief from the valve chamber 16 into the inlet flow passage 14a. As shown in FIG. 8, an upstream seat 234 is formed with seat vent passages in the form of ports 234a, 234b extending radially through the seat 234 to provide pressure relief on the upstream side of an expanding gate valve device. Provided the valve is of a type that the upstream seat 234 is sufficiently large, the ports 234a, 234b can be formed to be obstructed and sized to provide pressure relief from ice expansion in the closed position of the valve in the manner described above for the first pressure relief passage 105. In FIG. 8, the seat 234 is shown to include the features of the annular recess 80 and the raised annular sealing portion 84 of the bidirectional seat, but as noted above, these bidirectional sealing features are optional for an upstream seat.

FIG. 9 shows another embodiment of a vented upstream seat 334. The upstream seat 334 is formed with seat vent passages in the form of channels 334a, 334b extending radially across the front face 372 of the seat 334 to provide pressure relief on the upstream side of an expanding gate valve device. Provided the valve is of a type that the upstream seat 334 is sufficiently large, the channels 334a, 334b may be formed to be unobstructed and sized to provide pressure relief from ice expansion in the closed position of the valve as described above for first pressure relief passage 105. In FIG. 9, the seat 334 is shown to include the features of the annular recess 80 and the raised annular sealing portion 84, but as noted above, these bidirectional sealing features are optional for an upstream seat.

FIG. 10 shows another embodiment of an expanding gate valve device 400, similar to the device 10 of FIG. 1, but with pressure relief provided in the valve body 412. The valve device 400 includes a valve body vent passage 402 extending between the valve chamber 416 and the inlet flow passage 414a. The valve body vent passage 402 can be formed to be unobstructed and sized for pressure relief against ice expansion in the closed position, as described above for the first pressure relief passage 105. FIG. 10 shows both the upstream and the downstream annular seats 434, 436 configured as described above for annular seat 36 (i.e., with an annular recess and a raised annular sealing portion for bidirectional sealing), but these features are optional for the upstream seat. For ice expansion, the valve body vent passage 402 should be unobstructed and sized as described above for pressure relief passage 105.

Other pressure relief means are known in the industry, to provide pressure relief between the valve chamber and the valve inlet passage, and may be used as alternatives to the above-described embodiments showing venting in one or more of the segment, upstream annular seat or the valve body.

The bidirectional annular seat(s) and the pressure relief features of this invention have application with other types of expanding gate assemblies. Two alternate gate assemblies are shown in FIGS. 12 and 13.

FIGS. 12 and 13 show features of the invention, to provide bidirectional sealing capability and pressure relief, but applied to alternate embodiments of industry standard expanding gate valve devices. FIG. 12 shows an expanding gate valve device similar to that of FIG. 11, but with an alternate embodiment of a gate assembly 518. The gate assembly 518 of FIG. 12 is similar to that shown in U.S. Pat. No. 6,158,718 to Lang et al., but, in accordance with this invention, is further adapted with a first pressure relief passage 505 for ice expansion, and second pressure relief passages 510 to provide pressure relief between the valve chamber and the inlet flow passage in both the closed and open positions, as described above for FIG. 11. In FIG. 12, the gate assembly 518 is also shown with the upstream and downstream annular seats 534 and 536 similar to seats 34 and 36 as described for FIG. 11 to provide for bidirectional sealing capability. However, instead of a gate 20 and segment 28 as in FIG. 11, a first member 528 of the gate assembly 518 which is adapted to face the inlet flow passage is supported on a notched shoulder 543 formed in a second member 520 of the gate assembly. The first and second members 528 and 520 are formed with mating upper angulated planar cam surfaces 546 and 542, but the lower mating surfaces 548 and 544 are oriented vertically (i.e., not angulated). However, the first and second members 528 and 520 are otherwise similarly spring biased and adapted to expand in the open and closed positions of the gate assembly 518, and to collapse together as the gate assembly 518 is moved between the open and closed positions.

FIG. 13 shows an expanding gate valve device similar to that of FIG. 11, but with another embodiment of a gate assembly 618. The first and second members 628 and 620 of the gate assembly 618 differ from the segment 28 and gate 20 of FIG. 11 in that the function of the angulated planar cam surfaces of the segment and gate members 28, 20 of FIG. 11 for expanding and collapsing the gate assembly is instead provided by in FIG. 13 with a wedge shaped spreader assembly 690 which engages camming grooves 692 formed in the side walls 620a, 628b of the second and first members 620 and 628 respectively to that the members 620, 628 assume an expanded condition, but only in the fully closed position. The gate assembly 618 of FIG. 13 is similar to that described in U.S. Pat. Nos. 3,349,789 and 4,179,099, but is further adapted in accordance with the invention herein to show the first pressure relief passage 605 for ice expansion in the closed position, and the second vent passages 610 for pressure relief in the open position. In FIG. 13, the gate assembly 618 is also shown with the upstream and downstream annular seats 634 and 636 similar to seats 34 and 36 as described for FIG. 11 to provide for bidirectional sealing capability.

Operation

Operation for bidirectional sealing capability is described with reference to the embodiments of FIGS. 1-11, but is similar for other expanding gate valve devices such as those in FIGS. 12 and 13. In operation, the expanding gate valve device 10 is capable of operating with seals against upstream pressure and against downstream pressure. The downstream annular seat 36 is provided with bidirectional sealing capability by:

(a) forming the downstream annular seat with an annular recess extending generally radially outwardly from the inner peripheral surface so that the flex portion of the seat between the recess and the front sealing face at the central bore flexes toward the gate member against downstream pressure, and (b) forming the front face of the downstream annular seat with an annular sealing portion on the flex portion of the seat adjacent the central bore, the annular sealing portion being raised relative to the generally planar front face and making sealing contact with the gate member when the gate assembly is in the expanded condition and when the front sealing face flexes in the upstream direction against downstream pressure.

With the bidirectional downstream seat 36 in the downstream seat pocket 40, a method of sealing is provided by:

operating the expanding gate valve device against upstream wellhead pressure with the upstream and downstream annular seats making sealing contact with the gate assembly when the gate assembly is in the expanded condition in the fully open position and in the fully closed position; and operating or testing the expanding gate valve device against downstream pressure with the flex portion of the downstream annular seat flexing toward the gate member and with the annular sealing portion on the flex portion making sealing contact with the gate member when the gate assembly is in the expanded condition.

As used herein and in the claims, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

All references mentioned in this specification are indicative of the level of skill in the art of this invention. All references are herein incorporated by reference in their entirety to the same extent as if each reference was specifically and individually indicated to be incorporated by reference. However, if any inconsistency arises between a cited reference and the present disclosure, the present disclosure takes precedence. Some references provided herein are incorporated by reference herein to provide details concerning the state of the art prior to the filing of this application, other references may be cited to provide additional or alternative device elements, additional or alternative materials, additional or alternative methods of analysis or application of the invention.

The terms and expressions used are, unless otherwise defined herein, used as terms of description and not limitation. There is no intention, in using such terms and expressions, of excluding equivalents of the features illustrated and described, it being recognized that the scope of the invention is defined and limited only by the claims which follow. Although the description herein contains many specifics, these should not be construed as limiting the scope of the invention, but as merely providing illustrations of some of the embodiments of the invention.

One of ordinary skill in the art will appreciate that elements and materials other than those specifically exemplified can be employed in the practice of the invention without resort to undue experimentation. All art-known functional equivalents, of any such elements and materials are intended to be included in this invention. The invention illustratively described herein suitably may be practised in the absence of any element or elements, limitation or limitations which is not specifically disclosed herein.

We claim:

1. An expanding gate valve device comprising:
a valve body having a valve chamber therein and axially aligned first and second flow passages communicating with the valve chamber;
a bonnet assembly closing the valve chamber;
an annular seat pocket formed in the valve body surrounding the second flow passage and opening into the valve chamber, the seat pocket forming a side wall axially aligned with the second flow passage and a back wall generally at a right angle to the side wall;
an expanding gate assembly comprising a first member facing the first flow passage and a second member facing the second flow passage, the gate assembly being slidably mounted within the valve chamber for linear movement between open and closed positions and having an expanded condition with the first and second members expanding away from each other at the closed position, and a collapsed condition with the first and second members collapsing together as the gate assembly is moved between the open and closed positions, the first member and the second member each being formed with a port in a ported portion of the members, the port extending therethrough alignable with the flow passages in the open position;
a stem coupled to the gate assembly to move the gate assembly between the open and closed positions relative to the first and second flow passages;
a bidirectional metal annular seat within the seat pocket, adapted for sealing to the side wall and to the back wall of the seat pocket when the seat is in sealing contact with the gate assembly, the seat being formed with a central bore aligned with the flow passages, opposed front and rear sealing faces, and opposed inner and outer peripheral surfaces, so that when seated, the inner peripheral surface faces the central bore, the outer peripheral surface faces the side wall of the seat pocket, the front sealing face faces the gate assembly and, against pressure along the first flow passage, makes sealing contact with the second member of the gate assembly when the gate assembly is in the expanded condition, and the rear sealing face faces and makes sealing contact with the back wall of the seat pocket;
the annular seat being formed with an annular recess extending generally radially outwardly from the inner peripheral surface so that a flex portion of the seat located between the recess and the front sealing face at the central bore flexes toward the second member of the gate assembly against pressure along the second flow passage; and
the front face of the annular seat forming an annular sealing portion on the flex portion of the seat adjacent the central bore, the annular sealing portion being raised relative to a generally planar portion of the front face to provide sealing contact with the second member of the gate assembly when the gate assembly is in the expanded condition and when the flex portion flexes toward the second member against pressure along the second flow passage.

2. The device of claim 1, wherein the metal annular seat is sized to provide an interference fit within the seat pocket so as to provide a metal-to-metal seal to one or both of the side wall and the back wall of the seat pocket.

3. The device of claim 2, wherein the annular recess has a radial depth of between 25% and 75% of the distance to the outer peripheral wall, or between 40% and 60%, or between 45% and 55%.

4. The device of claim 3, wherein the annular recess is an annular groove.

5. The device of claim 3, wherein the annular recess is a cut-away portion of the inner peripheral surface extending to the rear sealing face.

6. The device of claim 3, wherein the annular sealing portion of the front sealing face of the annular seat is a tapered portion extending from a most raised portion at the central bore and transitioning to the generally planar portion of the front face.

7. The device of claim 6, wherein the tapered portion transitions to the generally planar front face portion at a point beyond the radial depth of the annular recess.

8. The device of claim 7, wherein the annular recess is an annular groove.

9. The device of claim 3, wherein the annular sealing portion of the front sealing face of the annular seat forms a raised bump or a raised ridge at or adjacent the central bore.

10. The device of claim 3, wherein the front sealing face of the annular seat provides a metal-to-metal seal to the gate assembly when the gate assembly is in the closed position.

11. The device of claim 3, wherein the gate assembly is adapted to be in the expanded condition in both the open and the closed positions.

12. The device of claim 11, wherein the gate assembly is of a type wherein the first member is a segment and the second member is a gate member, and the gate assembly is adapted to be in the expanded condition in both the open and closed positions.

13. The device of claim 3, wherein the annular seat provide a metal-to-metal seal to the gate assembly.

14. The device of claim 1, wherein the valve device is vented to provide pressure relief from the valve chamber into the first flow passage.

15. The device of claim 14, wherein:
the first flow passage is optionally formed with a seat pocket and holds either, a unidirectional metal annular seat or the bidirectional metal annular seat, for sealing to the first member of the gate assembly in the expanded condition;
one or more of the gate assembly, the valve body, and the annular seat in the first flow passage includes one or more pressure relief passages communicating between the valve chamber and the first flow passage to provide pressure relief in one or both of the open and closed positions.

16. The device of claim 15, wherein:
a first pressure relief passage communicating between the valve chamber and the first flow passage is formed in one or more of the gate assembly, the valve body and the annular seat in the first flow passage to provide pressure relief in the closed position;
the first pressure relief passage is unobstructed so as to allow ice forming therein to be extruded by the pressure of ice expansion; and
the first pressure relief passage has a transverse cross-section sized such that, ice forming in the first pressure relief passage extrudes in a direction from the valve chamber to the first flow passage, and at a pressure less than the pressure capacity of each of the valve body and the bonnet assembly.

17. The device of claim 16, wherein the first relief passage is formed in the first member, or in the first member and in the second member communicating between the valve chamber and the first flow passage in the closed position.

18. The device of claim 17, wherein:
the first pressure relief passage is located in a half portion of the first member opposite the ported portion, or in the half portion opposite the ported portion of both the first member and the second member; and
the first pressure relief passage has an outlet opening into the first flow passage in the closed position of the gate assembly, and one or more inlets opening into the valve chamber in the closed position of the gate assembly.

19. The device of claim 18, wherein:
the first pressure relief passage is a generally T-shaped port of cylindrical cross section, with the outlet positioned generally centrally in the half portion of the first member opposite the half portion forming the port, and having an axis parallel to a centre axis of the first flow passage, and with a pair of inlets aligned along an inlet axis which is oriented perpendicular to, and intersecting with, the outlet axis, the inlets being formed in one or both of the first member and in the second member.

20. The device of claim 19, wherein the first pressure relief passage is formed in the first member with the pair of inlets formed in the first member.

21. The device of claim 16, wherein one or both of the first member and the second member is formed with a second pressure relief passage communicating between the valve chamber and the first flow passage when the gate assembly is in the open position.

22. The device of claim 15, wherein the one or more pressure relief passages provide pressure relief in both of the open and closed positions while maintaining bidirectional sealing of the bidirectional annular seat.

23. The device of claim 1, wherein the first flow passage is formed with a seat pocket and holds either, a unidirectional metal annular seat or the bidirectional metal annular seat, for sealing to the first member of the gate assembly in the expanded condition.

24. A bidirectional metal annular seat for use in an expanding gate valve device of the type comprising a valve body having a valve chamber therein and axially aligned first and second flow passages communicating with the valve chamber,
a bonnet assembly closing the valve chamber,
an annular seat pocket formed in the valve body surrounding the second flow passage and opening into the valve chamber, the seat pocket forming a side wall axially aligned with the second flow passage and a back wall generally at a right angle to the side wall,
an expanding gate assembly comprising a first member facing the first flow passage and a second member facing the second flow passage, the gate assembly being slidably mounted within the valve chamber for linear movement between open and closed positions and having an expanded condition with the first and second members expanding away from each other at the closed position, and a collapsed condition with the first and second members collapsing together as the gate assembly is moved between the open and closed positions, the first member and the second member each being formed with a port in a ported portion of the members, the port extending therethrough alignable with the flow passages in the open position, and
a stem coupled to the gate assembly to move the gate assembly between the open and closed positions relative to the first and second flow passages,
the bidirectional metal annular seat comprising: a bidirectional metal annular seat adapted to seat within the seat pocket, and adapted for sealing to the side wall and to the back wall of the seat pocket when the seat is in sealing contact with the gate assembly, the seat being formed with a central bore to be aligned with the flow passages, opposed front and rear sealing faces, and opposed inner and outer peripheral surfaces, so that when seated, the inner peripheral surface faces the central bore, the outer peripheral surface faces the side wall of the seat pocket, the front sealing face faces the gate assembly and, against pressure along the first flow passage, makes sealing contact with the second member of the gate assembly when the gate assembly is in the expanded condition, and the rear sealing face faces and makes sealing contact with the back wall of the seat pocket;
the annular seat being formed with an annular recess extending generally radially outwardly from the inner peripheral surface so that a flex portion of the seat located between the recess and the front sealing face at the central bore flexes toward the second member of the gate assembly against pressure along the second flow passage.

25. A method of sealing a gate assembly in an expanding gate valve device against pressure along either of the flow passages, wherein the expanding gate valve includes:
a valve body having a valve chamber therein and axially aligned first and second flow passages communicating with the valve chamber;
a bonnet assembly closing the valve chamber;
an annular seat pocket formed in the valve body surrounding the second flow passage and opening into the valve chamber, the seat pocket forming a side wall axially aligned with the second flow passage and a back wall generally at a right angle to the side wall;
an expanding gate assembly comprising a first member facing the first flow passage and a second member facing the second flow passage, the gate assembly being slidably mounted within the valve chamber for linear movement between open and closed positions and having an expanded condition with the first and second members expanding away from each other at the closed position, and a collapsed condition with the first and second members collapsing together as the gate assembly is moved between the open and closed positions, the first member and the second member each being formed with a port extending therethrough alignable with the flow passages in the open position;
a stem coupled to the gate assembly to move the gate assembly between the open and closed positions relative to the first and second flow passages;
a bidirectional metal annular seat within the seat pocket, adapted for sealing to the side wall and to the back wall of the seat pocket when the seat is in sealing contact with the gate assembly, the seat being formed with a central bore aligned with the flow passages, opposed front and rear sealing faces, and opposed inner and outer peripheral surfaces, so that when seated, the inner peripheral surface faces the central bore, the outer peripheral surface faces the side wall of the seat pocket, the front sealing face faces the gate assembly and, against pressure along the first flow passage, makes sealing contact with the second member of the gate assembly when the gate assembly is in the expanded condition, and the rear sealing face faces and makes sealing contact with the back wall of the seat pocket, the method comprising:
(i) providing bidirectional sealing capability to the annular seat, by:
(a) forming the annular seat with an annular recess extending generally radially outwardly from the inner peripheral surface so that a flex portion of the seat located between the recess and the front sealing face at the central bore flexes toward the second member of the gate assembly gate member against pressure along the second flow passage, and
(b) forming the front face of the annular seat with an annular sealing portion on the flex portion of the seat adjacent the central bore, the annular sealing portion being raised relative to a generally planar portion of front face to provide sealing contact with the second member of the gate assembly when the gate assembly is in the expanded condition and when the flex portion face flexes toward the second member against pressure along the second flow passage;
(ii) operating the expanding gate valve device against pressure along the first flow passage with the annular seat making sealing contact with the gate assembly when the gate assembly is open and closed positions; and
(iii) operating or testing the expanding gate valve device against pressure along the second flow passage with the flex portion of the downstream annular seat flexing toward the gate member and with the annular sealing portion on the flex portion making sealing contact with the second member when the gate assembly is in the expanded condition.

26. The method of claim 25, wherein the annular seat is sized to provide an interference fit within the seat pocket so as to provide a metal-to-metal seal to one or both of the side wall and the back wall of the seat pocket.

27. The method of claim 26, further comprising providing pressure relief from the valve chamber into the first flow passage.

28. The method of claim 27, wherein:
the first flow passage is optionally formed with a seat pocket and holds either, a unidirectional metal annular seat or the bidirectional metal annular seat, for sealing to the first member of the gate assembly in the expanded condition;
one or more of the gate assembly, the valve body, and the annular seat in the first flow passage includes one or more pressure relief passages communicating between the valve chamber and the first flow passage to provide pressure relief in one or both of the open and closed positions.

29. The method of claim 28, further comprising:
providing pressure relief from the valve chamber into the first flow passage in the closed position by forming a first pressure relief passage in one or more of the gate assembly, the valve body and the annular seat in the first flow passage to provide pressure relief in the closed position, the first pressure relief passage being unobstructed so as to allow ice forming therein to be extruded by the pressure of ice expansion, and the first pressure relief passage having a transverse cross-section sized such that, ice forming in the first pressure relief passage extrudes in a direction from the valve chamber to the first flow passage, and at a pressure less than the pressure capacity of each of the valve body and the bonnet assembly.

30. The method of claim 29, further comprising:
providing pressure relief from the valve chamber into the first flow passage in the open position by forming one or both of the first member and the second member with a second pressure relief passage communicating between the valve chamber and the inlet flow passage.

31. An expanding gate valve device comprising:
a valve body having a valve chamber therein and axially aligned first and second flow passages communicating with the valve chamber;
a bonnet assembly closing the valve chamber;
an annular seat pocket formed in the valve body surrounding the second flow passage and opening into the valve chamber, the seat pocket forming a side wall axially aligned with the second flow passage and a back wall generally at a right angle to the side wall;
an expanding gate assembly comprising a first member facing the first flow passage and a second member facing the second flow passage, the gate assembly being slidably mounted within the valve chamber for linear movement between open and closed positions and having an expanded condition with the first and second members expanding away from each other at the closed position, and a collapsed condition with the first and second members collapsing together as the gate assembly is moved between the open and closed positions, the first member and the second member each being formed with a port extending therethrough alignable with the flow passages in the open position;
a stem coupled to the gate assembly to move the gate assembly between the open and closed positions relative to the first and second flow passages;
a metal annular seat within the seat pocket, adapted for sealing to the side wall and to the back wall of the seat pocket when the seat is in sealing contact with the gate assembly, the seat being formed with a central bore aligned with the flow passages, opposed front and rear sealing faces, and opposed inner and outer peripheral surfaces, so that when seated, the inner peripheral surface faces the central bore, the outer peripheral surface faces the side wall of the seat pocket, the front sealing face faces the gate assembly and, against pressure along the first flow passage, makes sealing contact with the second member of the gate assembly when the gate assembly is in the expanded condition, and the rear sealing face faces and makes sealing contact with the back wall of the seat pocket;
the first flow passage optionally being formed with a seat pocket and holding a metal annular seat for sealing to the first member of the gate assembly in the expanded condition; and
a first pressure relief passage communicating between the valve chamber and the first flow passage in the closed position being formed in one or more of the gate assembly, the valve body, and the annular seat in the first flow passage to provide pressure relief in the closed position, the first pressure relief passage being unobstructed so as to allow ice forming therein to be extruded by the pressure of ice expansion, and the first pressure relief passage having a transverse cross-section sized such that, ice forming in the first pressure relief passage extrudes in a direction from the valve chamber to the first flow passage, and at a pressure less than the pressure capacity of each of the valve body and the bonnet assembly.

32. The device of claim 31, wherein the first relief passage is formed in the first member, or in the first member and in the second member communicating between the valve chamber and the first flow passage in the closed position.

33. The device of claim 32, wherein:
the first pressure relief passage is located in a half portion of the first member opposite the ported portion, or in the half portion opposite the ported portion of both the first member and the second member; and
the first pressure relief passage has an outlet opening into the first flow passage in the closed position of the gate assembly, and one or more inlets opening into the valve chamber in the closed position of the gate assembly.

34. The device of claim 33, wherein:
the first pressure relief passage is a generally T-shaped port of cylindrical cross section, with the outlet positioned generally centrally in the half portion of the first member opposite the ported portion, and having an axis parallel to a centre axis of the first flow passage, and with a pair of inlets aligned along an inlet axis which is oriented perpendicular to, and intersecting with, the outlet axis, the inlets being formed in one or both of the first member and the second member.

35. The device of claim 34, wherein the first pressure relief passage is formed in the first member with the pair of inlets formed in the first member.

36. The device of claim 31, wherein one or both of the first member and the second member is formed with a second pressure relief passage communicating between the valve chamber and the first flow passage when the gate assembly is in the open position.

37. The device of claim 31, wherein the first flow passage is formed with a seat pocket and holds a metal annular seat for sealing to the first member of the gate assembly in the expanded condition.

38. The device of claim 37, wherein the gate assembly is of a type wherein the first member is a segment and the second member is a gate member, and the gate assembly is adapted to be in the expanded condition in both the open and closed positions.

* * * * *